US 8,784,722 B2

(12) United States Patent
Rocha

(10) Patent No.: US 8,784,722 B2
(45) Date of Patent: Jul. 22, 2014

(54) METHOD AND APPARATUS FOR PRODUCING HOOK FASTENERS

(76) Inventor: Gerald Rocha, Bedford, NH (US)

(*) Notice: Subject to any disclaimer, the term of this patent is extended or adjusted under 35 U.S.C. 154(b) by 785 days.

(21) Appl. No.: 12/690,700

(22) Filed: Jan. 20, 2010

(65) Prior Publication Data

US 2010/0180407 A1 Jul. 22, 2010

Related U.S. Application Data

(60) Provisional application No. 61/145,883, filed on Jan. 20, 2009.

(51) Int. Cl.
| | |
|---|---|
| *B29B 13/08* | (2006.01) |
| *B28B 1/087* | (2006.01) |
| *B29C 59/04* | (2006.01) |
| *B29C 59/02* | (2006.01) |
| *A44B 18/00* | (2006.01) |
| *B29L 31/00* | (2006.01) |

(52) U.S. Cl.
CPC ............. *B29C 59/04* (2013.01); *B29C 59/046* (2013.01); *B29C 59/025* (2013.01); *A44B 18/0046* (2013.01); *B29L 2031/729* (2013.01)
USPC .............................. 264/444; 267/443; 267/70

(58) Field of Classification Search
CPC ................................ B29C 59/04; B29C 59/16
USPC ........................................ 264/444, 443, 70
See application file for complete search history.

(56) References Cited

U.S. PATENT DOCUMENTS

| | | | |
|---|---|---|---|
| 3,182,589 A | 5/1965 | Green | |
| 3,192,589 A | 7/1965 | Pearson | |
| 3,196,490 A | 7/1965 | Erb | |
| 3,270,408 A | 9/1966 | Nealis | |
| 3,312,583 A | 4/1967 | Rochlis | |
| 3,541,216 A | 11/1970 | Rochlis | |

(Continued)

FOREIGN PATENT DOCUMENTS

| | | |
|---|---|---|
| CN | 1176616 A | 3/1998 |
| EP | 1 136 242 A2 | 9/2001 |

(Continued)

OTHER PUBLICATIONS

International Search Report and Written Opinion dated May 18, 2010 issued in related International Patent Application No. PCT/US2010/021512.

(Continued)

*Primary Examiner* — Yongendra Gupta
*Assistant Examiner* — Kimberly A Stewart
(74) *Attorney, Agent, or Firm* — Wolf, Greenfield & Sacks, P.C.

(57) ABSTRACT

Apparatus and process are described for forming projections on a substrate for use as hook-type fasteners in touch fastening systems, wherein vibration energy may be used to soften a substrate which may be positioned between a mold and a source of vibration. The mold may include a plurality of cavities into which the softened substrate may be forced to form the projections. The substrate may comprise a film, sheet, web, composite, laminate, etc. and be useful as an attachment strip for temporary or permanent fastening. The source of vibration may be an ultrasonic horn. The process to form such projections may be operated in a continuous, semi-continuous or intermittent manner.

42 Claims, 23 Drawing Sheets

(56) References Cited

U.S. PATENT DOCUMENTS

| | | | |
|---|---|---|---|
| 3,665,504 A | 5/1972 | Silverman | |
| 3,735,468 A | 5/1973 | Erb | |
| 3,752,619 A | 8/1973 | Menzin et al. | |
| 3,758,657 A | 9/1973 | Menzin et al. | |
| 3,762,000 A | 10/1973 | Menzin et al. | |
| 3,837,973 A | 9/1974 | Hiroshia sakura et al. | |
| 4,149,540 A | 4/1979 | Hasslinger | |
| 4,194,937 A | 3/1980 | Hashmall | |
| 4,326,903 A | 4/1982 | Summo | |
| 4,411,721 A | 10/1983 | Wishart | |
| 4,548,116 A | 10/1985 | Yoshida et al. | |
| 4,615,084 A | 10/1986 | Erb | |
| 4,775,310 A | 10/1988 | Fischer | |
| 4,794,028 A | 12/1988 | Fischer | |
| 4,811,428 A | 3/1989 | Waldman et al. | |
| 4,881,997 A | 11/1989 | Hatch | |
| 4,980,003 A | 12/1990 | Erb et al. | |
| 4,999,067 A | 3/1991 | Erb et al. | |
| 5,340,301 A | 8/1994 | Saffire et al. | |
| 5,393,475 A | 2/1995 | Murasaki et al. | |
| 5,500,268 A | 3/1996 | Billarant | |
| 5,607,635 A | 3/1997 | Melbye et al. | |
| 5,614,057 A | 3/1997 | Conley et al. | |
| 5,624,427 A | 4/1997 | Bergman et al. | |
| 5,647,552 A | 7/1997 | Takatori | |
| 5,657,516 A | 8/1997 | Berg et al. | |
| 5,725,704 A * | 3/1998 | Gallagher et al. | 156/66 |
| 5,755,015 A | 5/1998 | Akeno et al. | |
| 5,781,969 A | 7/1998 | Akeno et al. | |
| 5,792,408 A | 8/1998 | Akeno et al. | |
| 5,824,955 A | 10/1998 | Saiso et al. | |
| 5,860,194 A | 1/1999 | Takizawa et al. | |
| 5,879,494 A | 3/1999 | Hoff et al. | |
| 5,919,492 A | 7/1999 | Tarr et al. | |
| 5,919,493 A * | 7/1999 | Sheppard et al. | 425/174.2 |
| 6,054,091 A | 4/2000 | Miller et al. | |
| 6,165,298 A * | 12/2000 | Samida et al. | 156/73.1 |
| 6,287,665 B1 * | 9/2001 | Hammer | 428/100 |
| 6,481,063 B2 | 11/2002 | Shepard et al. | |
| 6,544,245 B2 | 4/2003 | Neeb et al. | |
| 6,627,133 B1 | 9/2003 | Tuma | |
| 6,645,330 B2 | 11/2003 | Pargass et al. | |
| 6,694,576 B1 | 2/2004 | Fujisawa et al. | |
| 7,032,278 B2 | 4/2006 | Kurtz | |
| 7,172,008 B2 | 2/2007 | Vanbenschoten et al. | |
| 7,241,483 B2 | 7/2007 | Ausen et al. | |
| 7,335,205 B2 | 2/2008 | Aeschlimann et al. | |
| 7,350,276 B2 | 4/2008 | Minato et al. | |
| 7,374,626 B2 | 5/2008 | Van Der Leden | |
| 7,451,532 B2 | 11/2008 | Provost et al. | |
| 7,461,437 B2 | 12/2008 | Gallant et al. | |
| 7,479,195 B2 | 1/2009 | Leidig et al. | |
| 7,520,033 B2 | 4/2009 | Clarner | |
| 7,622,180 B2 | 11/2009 | Seth et al. | |
| 7,678,316 B2 | 3/2010 | Ausen et al. | |
| 8,322,002 B2 | 12/2012 | Cheng | |
| 8,399,086 B2 | 3/2013 | Itoh et al. | |
| 2003/0034583 A1 | 2/2003 | Provost | |
| 2003/0085492 A1 * | 5/2003 | Schulte | 264/443 |
| 2005/0132543 A1 | 6/2005 | Lindsay et al. | |
| 2005/0161851 A1 | 7/2005 | Tachauer et al. | |
| 2005/0177986 A1 | 8/2005 | Clarner et al. | |
| 2005/0209076 A1 | 9/2005 | Boutron et al. | |
| 2005/0280175 A1 * | 12/2005 | Tachauer et al. | 264/167 |
| 2008/0120815 A1 | 5/2008 | Line | |
| 2009/0018590 A1 | 1/2009 | Dorawa et al. | |
| 2012/0011685 A1 | 1/2012 | Rocha | |

FOREIGN PATENT DOCUMENTS

| | | |
|---|---|---|
| JP | H01-501775 A | 6/1989 |
| JP | H05-42951 A | 6/1989 |
| JP | 2001-266417 A | 9/2001 |
| JP | 2006-527634 A | 12/2006 |
| JP | 2007-076059 A | 3/2007 |
| WO | WO 87/06522 A1 | 11/1987 |
| WO | WO 2005/000065 A1 | 1/2005 |

OTHER PUBLICATIONS

Joshi, Welding of Plastics. Metal Web News. Last accessed online via www.metalwebnews.com/howto/plastics/welding-plastics.pdf. Pdf created Jun. 9, 2002. 5 pages.

Japanese Office Action for Application No. 2011-546442 mailed Mar. 3, 2014.

* cited by examiner

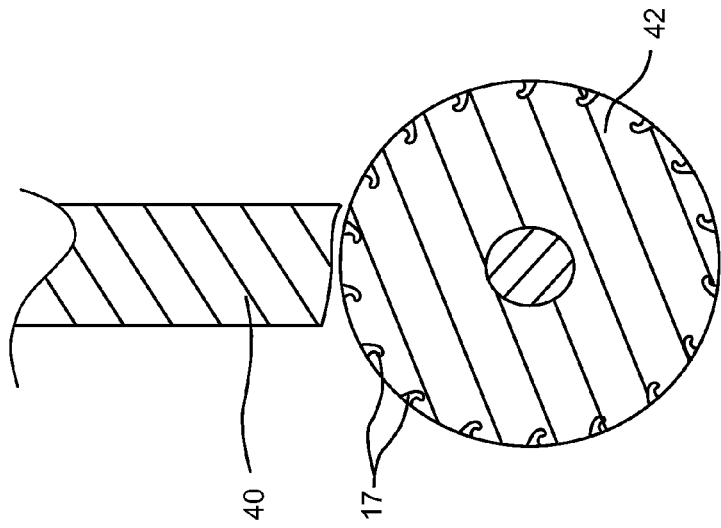
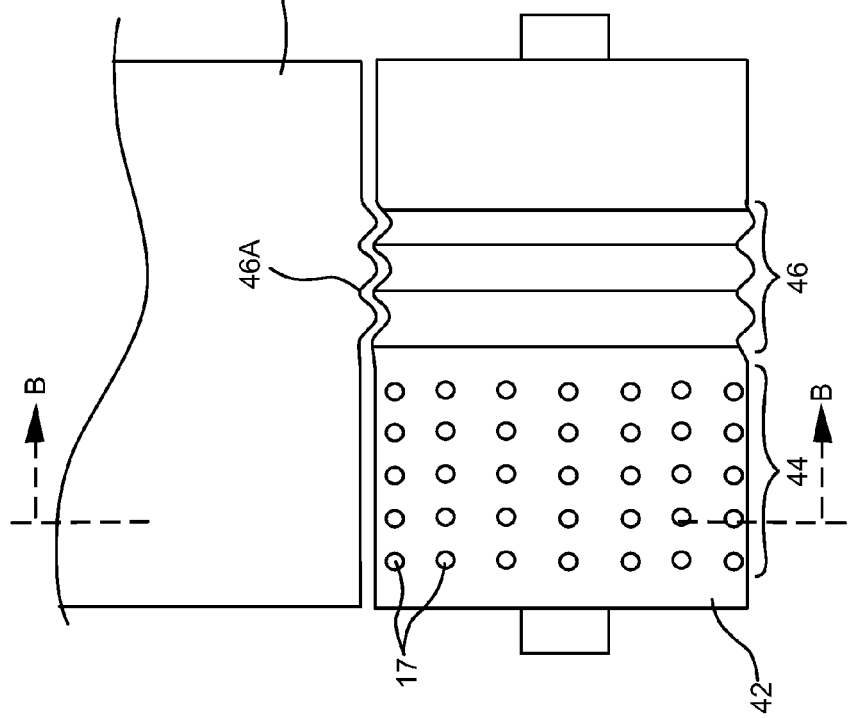

FIG. 17A
FIG. 17B
FIG. 17C
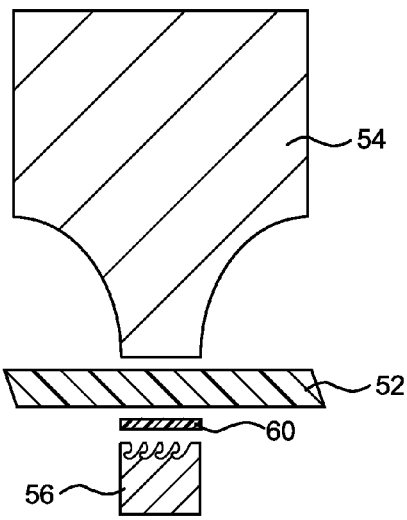
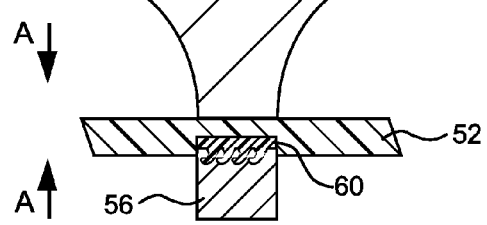
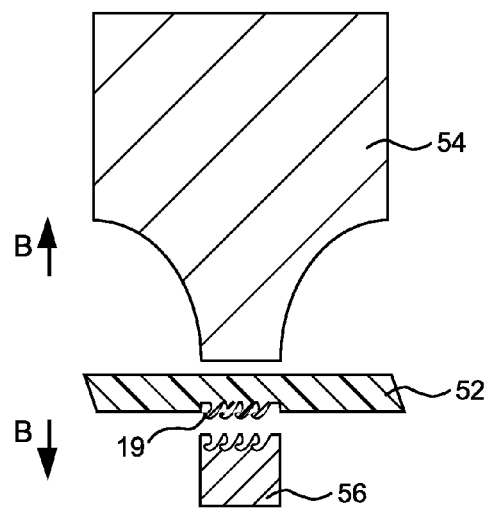

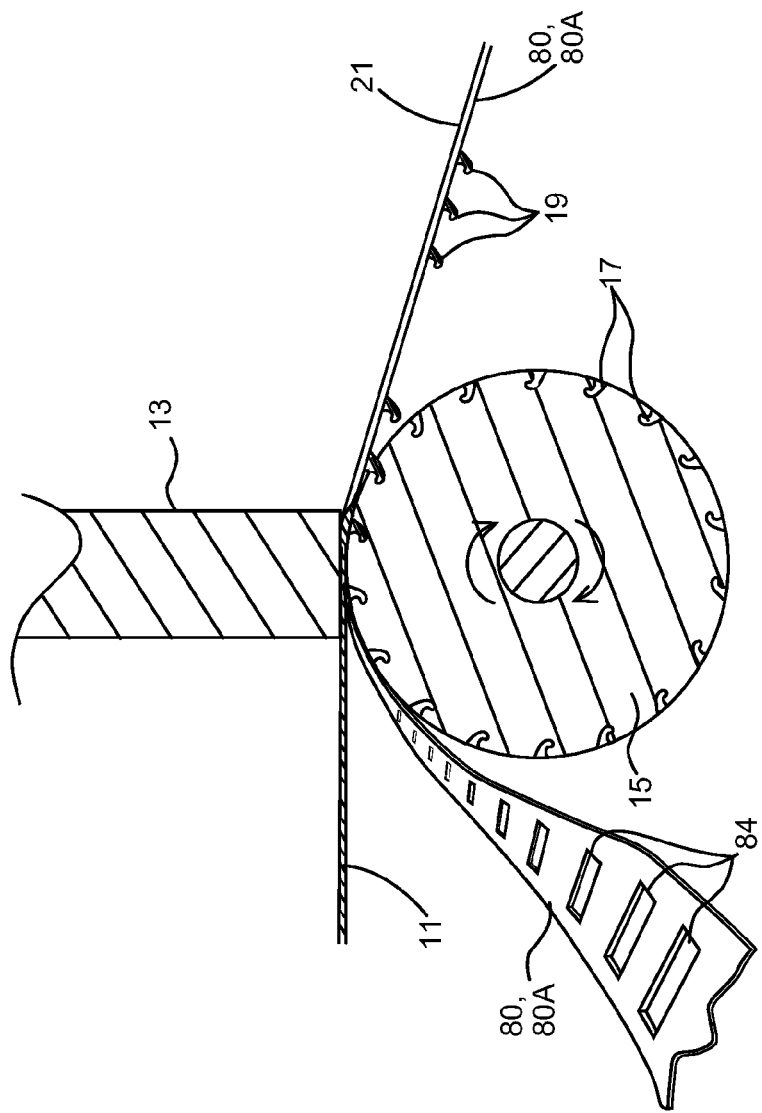

METHOD AND APPARATUS FOR PRODUCING HOOK FASTENERS

CROSS-REFERENCE TO RELATED APPLICATIONS

This application claims the benefit of U.S. Provisional Application No. 61/145,883, filed on Jan. 20, 2009.

FIELD

This disclosure relates generally to mechanical fasteners, such as hook and loop fasteners or touch fasteners, and more particularly, to a method and apparatus for producing "hook" fasteners using vibration energy.

BACKGROUND

Touch fasteners (known commercially as Velcro®, Scotch-mate®, Tri-Hook®, etc.) were originally produced using textile technology. Two of the most common types of touch fasteners are hook and loop fasteners and mushroom and loop fasteners.

Hook and loop type fasteners may consist of a pair of textile strips. These textile strips may be mated to form a recyclable closure; one of the mates being a strip of textile fabric having numerous monofilament elements, shaped like hooks, projecting from one surface and the other mate being a textile strip with multifilamented elements woven into loop shaped projections on one surface. When the mating surfaces of these strips are pressed together, numerous hook shaped elements on one strip snare loop elements on the opposing strip and create a temporary, reusable bond. As the strips are peeled apart, the hook elements may deform and separate from the loop elements allowing the fastener to be reused many times.

In the case of mushroom and loop fasteners, the hook type mating strip is replaced with a strip containing numerous monofilament projections having mushroom shaped or blunted heads. The mushroom shaped heads may be formed by heating the tips of straight monofilament projections until a flattened "mushroom head" is formed on each projection. When this strip is pressed together with a strip having loop shaped projections on the surface, the mushroom heads may snare loop elements on the opposing strip and create a temporary, reusable bond. As the strips are peeled apart, the mushroom shaped elements may occasionally deflect and release the loop element. In addition, two strips each having mushroom shaped projections may be engaged together with the blunted heads interacting to form a mechanical bond.

More recently the use of thermoplastic extrusion/molding methods for making touch fasteners has become popular. In the case of hook and loop fasteners, the hook strip may be formed by extruding a polymer into a web-like shape with integral projections, while the loop strip may still be produced using woven, knitted or non-woven technologies. In the case of mushroom and loop fasteners, the mushroom strip may be produced by extruding a polymer into a web-like shape with integral pin-like projections and post forming mushroom-like heads on the pin-like projections.

The use of extrusion/molding technologies for the production of hook type and mushroom type touch fasteners has reduced the manufacturing cost and improved the performance and aesthetics of touch fasteners, thus allowing their use in large volume applications such as tab closures on disposable diapers.

Examples of technologies used for the production of extruded/molded type touch fasteners, include:

Extruding/molding a hook fastener with an integral base where the base may be molded onto a molding roller wherein hooking elements may be molded in discreet cavities. The mold may be opened and closed continuously as it rotates to allow the hooks to be extracted. (See for instance, U.S. Pat. Nos. 3,762,000; 3,758,657 and 3,752,619 to Menzin and U.S. Pat. No. 3,196,490 to Erb.)

Extruding/molding a hook fastener with an integral base where the hooking elements may be molded in discreet cavities and the mold remains closed. The hooks may be pulled from the cavities after cooling. Geometry of the hooks may therefore be somewhat limited as they must be extractable from a closed mold. (See, for instance, U.S. Pat. Nos. 3,312,583 and 3,541,216 to Rochlis; U.S. Pat. Nos. 4,775,310 and 4,794,028 to Fischer; and U.S. Pat. No. 5,393,475 to Murasaki.)

Extruding a web of material with a series of rails of hook-like cross section, running parallel along the top surface of the web. The rails may be cross-cut intermittently down to the base material. The base material may be stretched to obtain spacing between the hook elements. (See for instance, U.S. Pat. Nos. 3,665,504 and 3,735,468 to Erb.)

Extruding a web of material with a series of molded pins or similar elements and post-forming the elements into a hook type or mushroom type fastener. (See for instance, U.S. Pat. Nos. 3,182,589: 3,270,408; 5,607,635; 5,755,015; 5,781,969 and 5,792,408.)

One common theme among all of these processes is the melting and feeding of thermoplastic material through an extruder or similar device. Although often considered efficient methods for the production of touch fasteners, extrusion/molding technologies may typically require significant investment in capital equipment (extruders, chillers, pumping systems, dryers, pellet transport systems), high process energy consumption, handling and pre-drying of raw materials, proper disposal of purging/cleaning materials and startup materials, the ventilation of noxious gases, etc. and the ability to wind rolls or otherwise process finished product non-stop.

A need exists for a method and apparatus to prepare hook type fastener elements for use in a closure system, particularly a reusable closure system, without the high capital investment and material inefficiencies as described above.

SUMMARY

In one exemplary embodiment, the present disclosure describes a process for forming projections on a substrate comprising providing a mold having an outer surface, providing a substrate material having a surface and providing a device as a source of vibration energy, wherein one or both of said mold and device contain a plurality of cavities, the cavities having a shape. This may then be followed by positioning the substrate material between the mold and the device and applying power to the device wherein a portion of the substrate material enters the cavities in the mold surface and forms projections on at least a portion of the surface of the substrate material, wherein the cavities are shaped to form projections as one or more of hooks, mushrooms, straight pins, angled pins, tapered pins, curved pins, grappling hook, multi-limbed, cross-shaped, Y-shaped and multi-lobed, each having cross-sections which are round, oval, square, rectangular, trapezoidal, solid, hollow and combinations thereof.

In another exemplary embodiment, the present disclosure relates to a process for forming projections on a substrate comprising providing a substrate material having a surface and providing a device as a source of vibration energy, the device having a surface containing a plurality of cavities, the cavities arranged along at least a portion of the surface, the cavities having a shape. This may then be followed by pressing the device against the surface of the substrate material and applying power to the device and forcing a portion of the substrate material into the cavities in the surface of the device, forming projections on the surface of the substrate material, the projections generally conforming to the shape of the cavities wherein the cavities are shaped to form projections as one or more of hooks, mushrooms, straight pins, angled pins, tapered pins, curved pins, grappling hook, multi-limbed, cross-shaped, Y-shaped and multi-lobed, each having cross-sections which are round, oval, square, rectangular, trapezoidal, solid, hollow and combinations thereof.

In another exemplary embodiment the present disclosure is directed at an apparatus for forming projections on a substrate comprising a mold having a surface and a device as source of vibration energy. One or both of the mold and device may contain a plurality of cavities, the cavities having a shape wherein the shape provides for the formation of a projection that is or can be post-processed into a shape suitable for mechanical engagement with a loop element or complimentary shaped projection or other mating material, such as foam, screen or non-woven material In another exemplary embodiment the present disclosure relates to apparatus for forming projections on a substrate comprising a device as source of vibration energy the device containing a plurality of cavities where the cavities have a shape and wherein the shape provides for the formation of projections in a substrate that are or can be post-processed into a shape suitable for mechanical engagement with a loop element or complimentary shaped projection or other mating material.

The present disclosure also relates to an article for mechanical engagement, the article comprising a substrate having two sides and including one or more projections extending from one or both sides, wherein the substrate has a machine direction (MD) and cross-direction (CD), and the article is characterized as having one or more of the following characteristics:
  i. the substrate has a tensile strength in said machine direction of $TS_1$ and the one or more projections have a tensile strength of $TS_2$, where $TS_2$ is equal to 50% of the value of $TS_1$, or higher; or
  ii. the substrate has a shrinkage in a given direction of $S_1$ and the one or more projections have a shrinkage in the same direction of $S_2$ and $S_2 \geq 0.50(S_1)$.

The present disclosure also relates to an article for mechanical engagement, the article comprising a substrate having two sides and including a plurality of projections extending from one or both sides, wherein the substrate, prior to the formation of a projection in the substrate surface, has a machine direction (MD) and cross-direction (CD), and the substrate is characterized as having biaxial orientation wherein the shrinkage in the machine direction and cross-direction have shrinkage values that are within +/−20% of one another, and wherein the substrate, after formation of a projection on the substrate surface, has a biaxial orientation wherein the shrinkage in the machine direction and cross-direction indicate shrinkage values that are within +/−20% of one another.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 10A is a schematic front view and FIG. 10B a schematic cross-sectional side view of another apparatus and process for making projections that may be used as hook-type fasteners in accordance with the present disclosure.

FIGS. 17A-C are sequential schematic cross-sectional side views of another apparatus and process for making projections that may be used as making hook fasteners in an intermittent manner at a location on a thermoplastic object in accordance with the present disclosure.

FIG. 21 is a schematic cross-sectional side view of the apparatus and process of FIG. 1 for making projections that may be used as hook fasteners wherein a masking material is combined with the substrate produced in accordance with the present disclosure.

DETAILED DESCRIPTION

Figure 1:
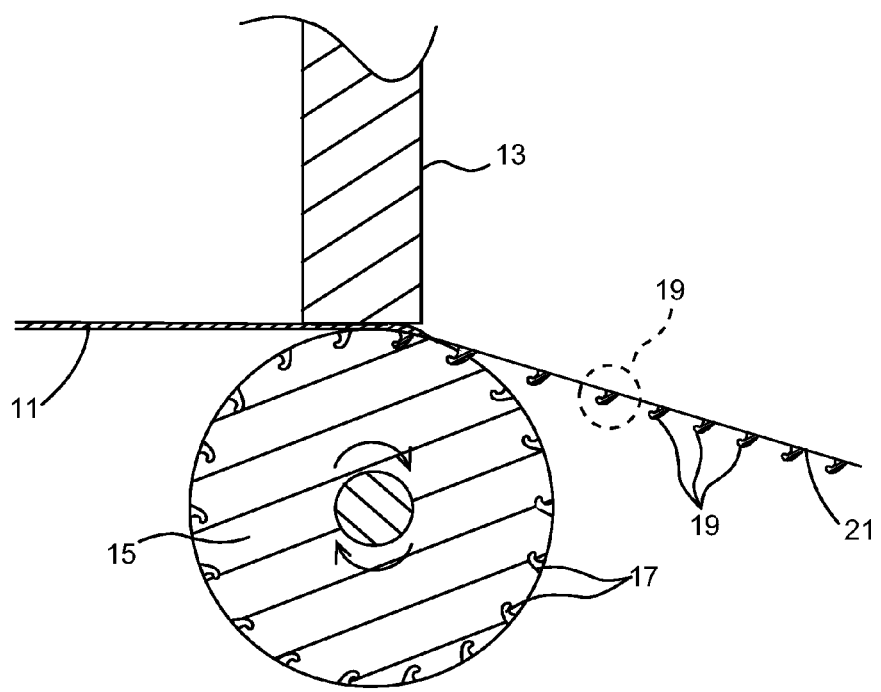
FIG. 1 is a schematic cross-sectional side view of an apparatus and process for forming projections which may be used as hook-type fasteners in accordance with the present disclosure.

Molded hook fasteners have generally been molded by, for instance, extruding or injecting a thermoplastic melt on a rotating drum, or mold, the mold comprised of a lamination or stack of metal plates, the plates having recessed or notched edges or otherwise designed to provide a series of cavities along the outer periphery that may be filled by the molten polymer. A strip-like base portion may be simultaneously molded from which projections, or hooks, molded in the cavities, may protrude.

It has been found that a relatively less complicated and relatively less expensive process may use vibration energy to soften the polymer to manufacture the projections (hooks, mushroom heads, etc.) instead of the extrusion or injection processes. In one exemplary embodiment, as shown in schematic cross-sectional side view in FIG. 1, a substrate of thermoplastic material 11 may be positioned or passed between a vibrating source 13 and a rotating molding roll 15, the roll containing multiple hook-shaped or otherwise shaped cavities 17, along the outer periphery. The substrate 11 may include, but not be limited to, film, sheet, web, composite, laminate or other form, or may be portions of a film, sheet, web, laminate or substrate thermoplastic material which may be used as individual fastening tabs, for instance on a disposable infant diaper. In their use on infant diapers, touch fasteners may be attached to a "side tab" that the consumer uses to secure a diaper to the infant. These tabs may be constructed with a piece of extensible material to allow the tab to stretch and flex when attached or when the infant moves. The present disclosure further contemplates the use of pre-formed film, sheet, web, composite, laminate, etc. as a substrate material.

During operation, the vibrating source 13 is positioned in close proximity to the outer surface of the rotating molding roll 15 and in contact with the substrate of thermoplastic material 11 being processed. The source of vibration 13 may include, but not be limited to, a vibrating ultrasonic horn, for example. These horns may be made from metals such as aluminum or titanium and are sold in the United States by companies such as Branson Ultrasonics, Dukane or Sonitek, and in Europe by a company such as Mecasonics. The source of vibration 13 may be vibrated in frequencies between about 50 Hz to about 50 kHz, as required. Other sources of vibration energy may be utilized, including but not limited to, a rotating eccentric roller, high pressure sound waves or other mechanical and/or electromechanical or acoustical forms of vibration energy. Such energy may therefore be transferred to a substrate and assist in the formation of the projection herein.

A portion of the thermoplastic material substrate 11 in contact with the molding roll 15 and vibrating source 13 may be softened by the vibration energy from the source and a desired portion of the thermoplastic material caused to enter into the cavities 17 of the molding roll forming hook-shaped or otherwise shaped elements or projections 19 on the front surface of the film or sheet 21 as the roll turns. This process may be referred to as rotary forming. Reference to a force may be understood as applying a requisite amount of pressure to the thermoplastic material to assist in its entry and fill-out of the cavities 17. The thermoplastic sheet 21 may function as a carrying strip for the hooks 19.

Thermoplastic materials which may be used to produce the hook fasteners may include, but not be limited to, polyamides, polyolefins such as polypropylene and polyethylene, acrylonitrile-butadiene-styrene (ABS), polyester, polycarbonate, polyvinyl chloride (PVC) and blends thereof. The thermoplastic materials may also be modified or reinforced with fillers, fibers, flame retardants, colorants, etc.

An advantage of the present invention is that the thermoplastic material that is immediately adjacent to the vibrating source may not melt and may therefore retain most, if not all, of its' original properties, in other words, not be subjected to a heat history which might detract from its' original properties.

Figure 18:
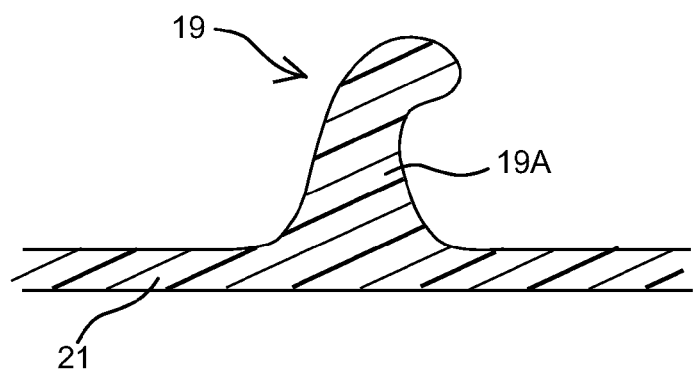
FIG. 18 is an enlarged cross-sectional view of an exemplary projection protruding from a substrate produced in accordance with the present disclosure.

When a previously molecularly oriented material or, alternatively, materials capable of being molecularly oriented are used, the molecular orientation of the material entering into the cavities may be maintained, increased or reduced by altering the vibration energies applied FIG. 18 is an enlarged cross-sectional view of an exemplary projection 19 protruding from a substrate 21 produced in accordance with an exemplary method of the present disclosure, such as shown in FIG. 1. Due at least in part to the relatively lower amount of heat imparted to the substrate by the vibratory action according to the present disclosure, as compared to other processes wherein the polymer is well-above the temperatures at which orientation is destroyed (e.g. Tg in the case of an amorphous polymer or Tm in the case of a crystalline polymer) the properties of the polymer which may depend upon orientation may be more efficiently maintained and/or even increased in value. That is, the stem portion 19A of the projection formed from the imposition of vibration energy may substantially maintain its molecular orientation or even increase somewhat as measured by shrinkage after forming or by its tensile strength after vs. before forming. For example, if the polymeric material, prior to entering the cavities, has a tensile strength (TS) in the direction of an orientation plane that is present (e.g. in the machine direction which may be understood as, e.g., the direction of extrusion) of $TS_1$, the projections, formed due to exposure to vibration energy, may still exhibit a tensile strength ($TS_2$) in a direction of orientation that is at least 50% of $TS_1$, or higher (e.g. up to 200%).

In addition, if the shrinkage attributable to orientation prior to exposure to vibrational energy is of a given value ($S_1$), in a given direction in said substrate, the shrinkage ($S_2$) that may exist after exposure to vibrational energy, in the same direction in the projection may be at least 50% of its original value, or higher (e.g. 150%). That is, $S_2 \geq 0.50(S_1)$. Reference to shrinkage herein may be understood as the loss in dimension that will occur when the substrate is heated to a temperature above which the orientation will relax and generally disappear. As noted herein, this may be above the glass transition temperature (Tg) for an amorphous polymer or about the melting point (Tm) for a crystalline polymer.

In addition, it is contemplated herein that one may start with a substrate that contains little or no orientation, which may be understood as that situation where the shrinkage is less than or equal to 5.0% in any given direction. It may also be characterized as that situation where the Elmendorf Tear strength in a given machine direction ($ET_{MD}$) is approximately equal to the Elmendorf Tear ($ET_{CD}$) in a given cross direction, with respect to a given substrate. Cross-direction may be understood as that direction, e.g., that is transverse to a machined direction (MD). That is, $ET_{MD}$ is within about +/−20% of $ET_{CD}$. Elmendorf tear strength may be measured by ASTM D1922 and may be understood as the average force required to propagate tearing through a length of the substrate at issue. Accordingly, for such substrate that contains little or no orientation, the application of vibrational energy and the formation of a projection for mechanical engagement may provide a projection that includes orientation, relative to the generally non-orientated substrate from which it was formed. The orientation in such projection may be such that it includes shrinkage in a given direction of greater than 5.0%.

Furthermore, it is contemplated herein that one may start with a substrate that has biaxial orientation, which may be understood as that situation where there is orientation in both the machine and cross-directions. For example, the machine and cross-direction may indicate relatively uniform shrinkage values of greater than 5.0%. It may therefore be appreciated that upon formation of a projection for mechanical engagement, the underlying substrate will now substantially retain the biaxial orientation, due to the ability to focus the vibration energy at the surface of the substrate, to form the projection, without substantially disturbing the underlying biaxial orientation present in the substrate.

It should also be noted that with respect to the properties of the substrate and projection noted above, one or more of such properties may be present in any given substrate/projection configuration.

Figure 19:
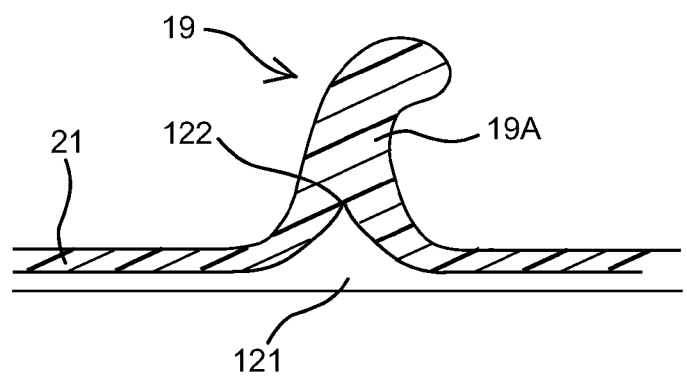
FIG. 19 is an enlarged cross-sectional view of an exemplary projection protruding from a layered substrate produced in accordance with an exemplary method of the present disclosure.

In the case where a multilayered material (laminate) may be utilized, a portion of one or more or the layered materials may be formed into the cavities allowing for the production of a product where the properties of the hook portion may be selectively engineered. FIG. 19 is an example of an enlarged cross-sectional view of an exemplary projection protruding from a layered substrate produced in accordance with an exemplary method of the present disclosure, such as shown in FIG. 1. Here, a second material 121 has been joined to the substrate material 21 and through processing according to the present disclosure, projection 19 is formed. A portion 122 of the second material 121 may extend into the body or stem 19A of the projection 19 and may provide enhanced properties to the projection. For example, portion 122, which is formed form substrate material 121 may have a different Shore Hardness value than the Shore Hardness value that is associated with substrate material 21.

Where a multilayered laminate is utilized, the fastener elements may be produced from one or more colors and the strip-like base may be of a different color(s). In addition, if a multilayered laminate is utilized having a transparent surface layer, the fastening elements or the strip-like material may be formed to be transparent.

Unlike prior art taught in this field where raw material is converted to a molten state prior to forming a substrate in web form to include integral projections, the present disclosure allows the substrate material to retain such desirable properties as molecular orientation, multicolored layers or composite structures by softening the polymer and forming it into the desired shape using vibratory energy, thereby also minimizing the thermal history of the polymer(s) processed.

With reference to FIG. 1, a means for cooling may be provided on or adjacent the molding roll 15 and the formed product, a strip 21 of polymer including a plurality of hook-type projections 19, may be peeled from the molding roll. Cooling may be accomplished by, for instance, cooling the molding roll externally and/or internally, cooling the vibrating source internally and/or externally and/or cooling the thermoplastic material directly and/or indirectly through the use of liquid, gas, air or other means.

In some instances, an after-burst of ultrasonic energy may be applied during or after cooling has taken place to aid in "decoupling" the projections from the mold or horn. This may be particularly useful when the projections are formed in the surface of the source of energy, i.e. the horn.

Figure 12:
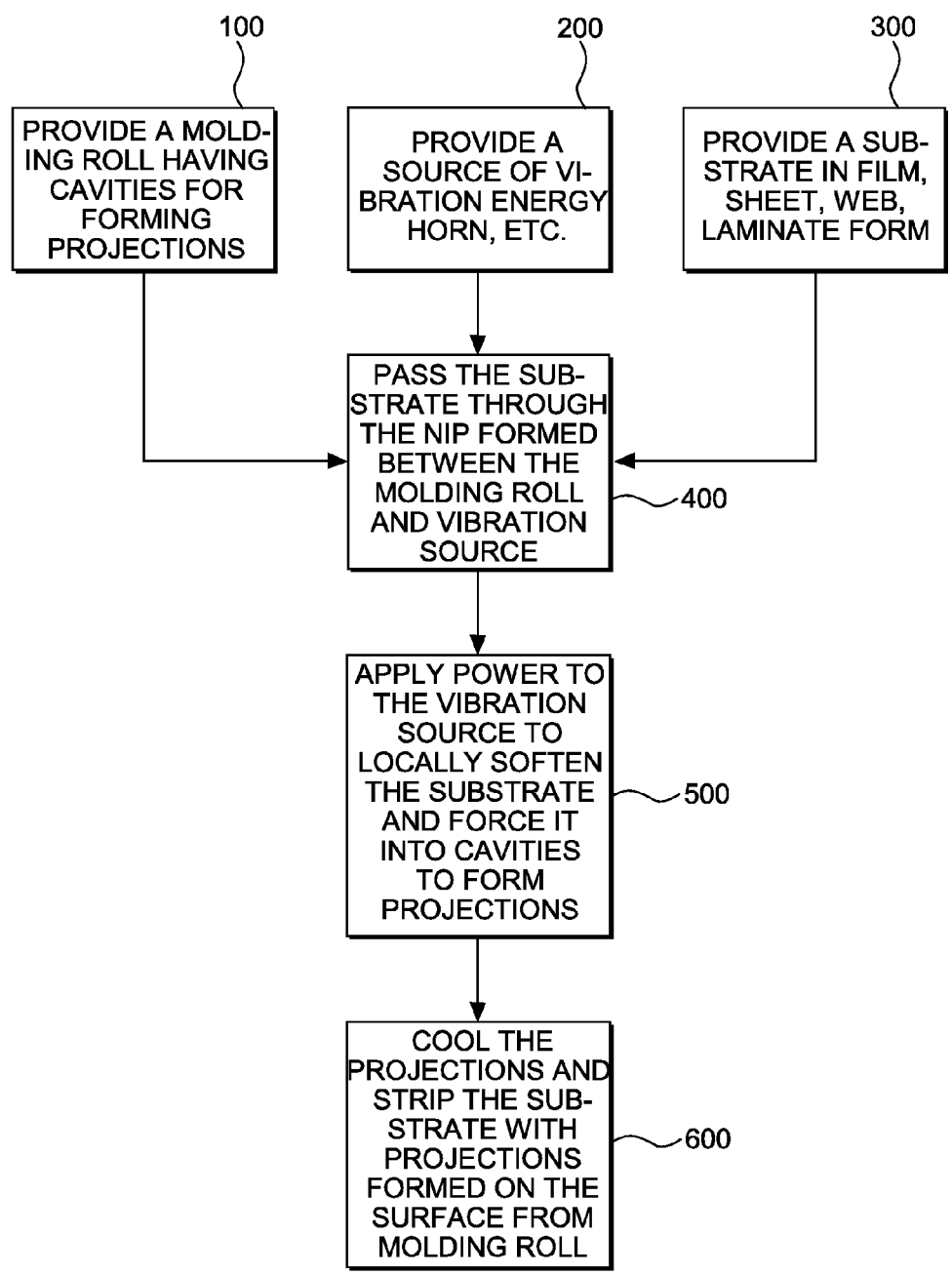
FIG. 12 is a block diagram of an exemplary process to provide hook-type fasteners, according to the present disclosure.

One example of a process for providing projections on a substrate which may be used as one of the mating portions in a touch fastening system is shown in FIG. 12. As described at Block 100, a molding roll, or other shape, may be provided containing multiple hook-shaped or otherwise shaped cavities, arranged along the outer periphery of the molding roll, the cavities capable of forming projections conforming to the shape of the cavities. In Block 200, a source of vibration energy may be provided, for instance an ultrasonic horn or roll. A substrate material may be provided (Block 300), in, for instance, film, sheet, web, laminate, composite, etc., form and the substrate positioned (Block 400) between the molding roll and source of vibration.

Figure 5:
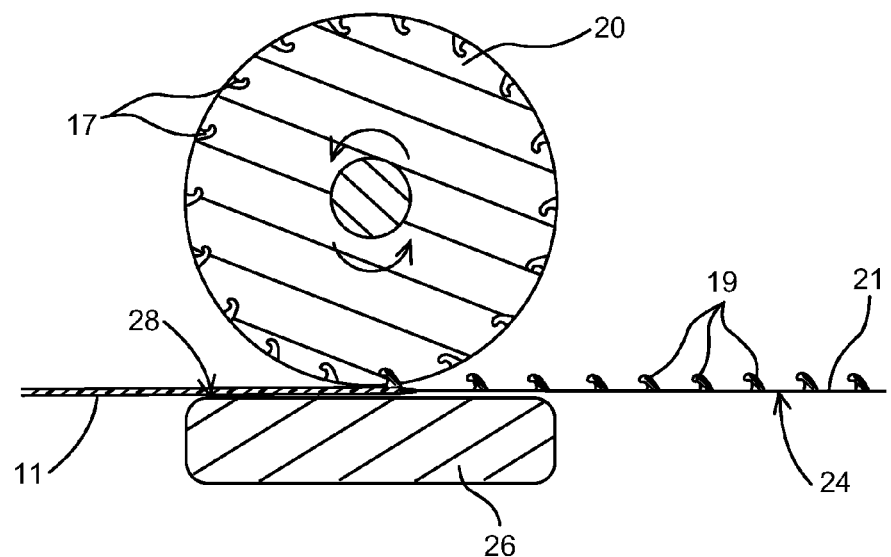
FIG. 5 is a schematic cross-sectional side view of another apparatus and process for making projections that may be used as hook fasteners in accordance with the present disclosure.
Figure 7:
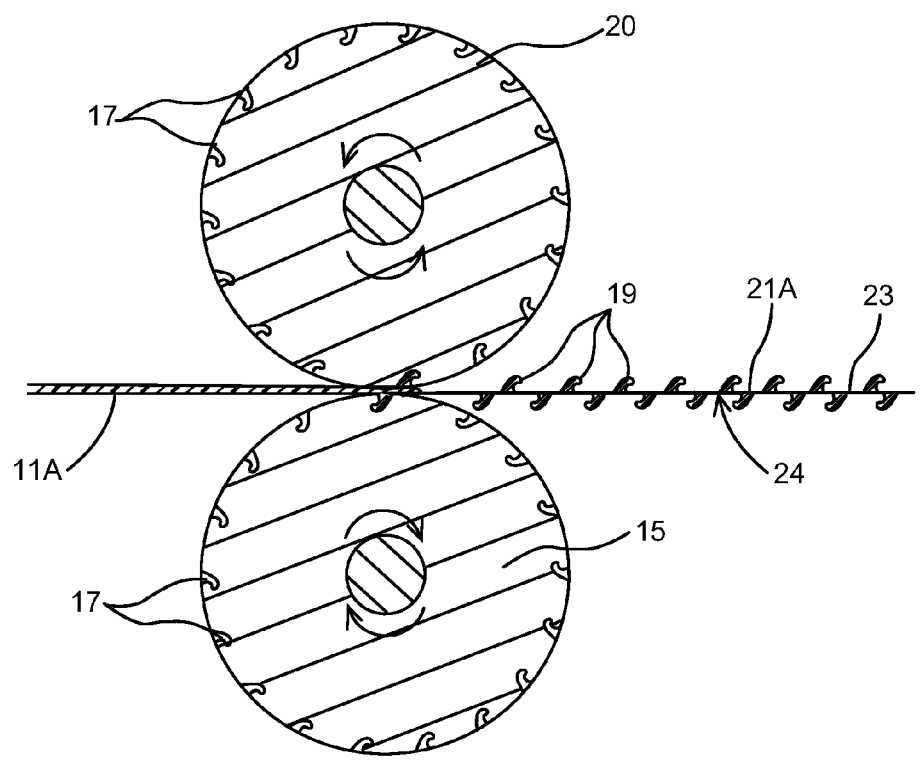
FIG. 7 is a schematic cross-sectional side view of another apparatus and process for making projections that may be used as making hook fasteners in accordance with the present disclosure.
Figure 8:
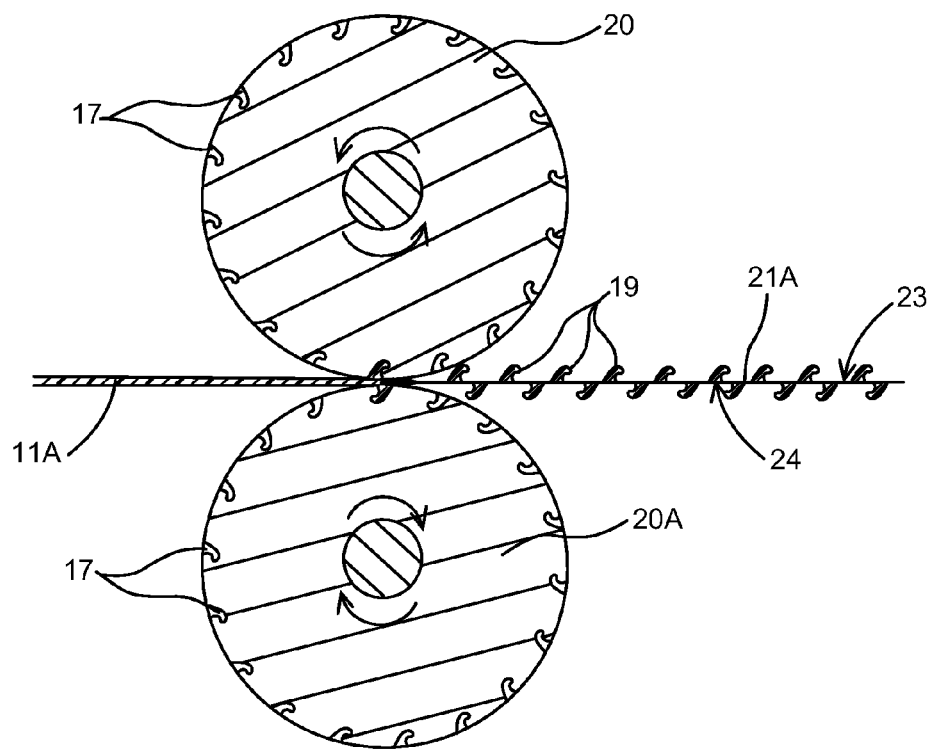
FIG. 8 is a schematic view cross-sectional side of another apparatus and process for making projections that may be used as making hook fasteners in accordance with the present disclosure.

Power may be applied (Block 500) to the source of vibration to selectively soften the substrate material and allow material into the cavities in the molding roll, forming projections. Alternatively, the molding roll may be smooth and the cavities for forming the projections may be formed into the surface of the source of vibration as depicted in FIGS. 5, 7 and 8.

The projections, and substrate, if required, may be cooled and the substrate including projections extending from the surface thereof may be stripped from the molding roll to form a strip for use in a touch fastener system. Cooling make take place between the molding roll and the source of vibration, in the molding roll or on the substrate after release from the roll. The projections may subsequently be post-formed into a desired shape.

As described herein, the cavities for forming the projections may be also be formed in the surface of a rotating horn (see FIGS. 4-8).

Figure 2:
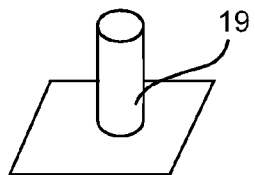
FIGS. 2 and 2A-N are schematic views of exemplary upstanding shapes that may be used as projections in accordance with the present disclosure.
Figure 2A:
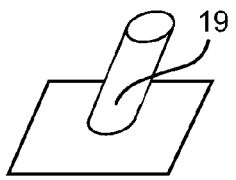
Figure 2B:
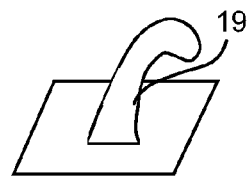
Figure 2C:
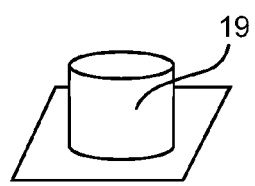
Figure 2D:
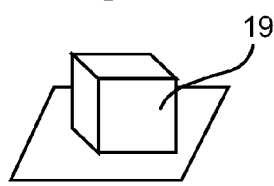
Figure 2E:
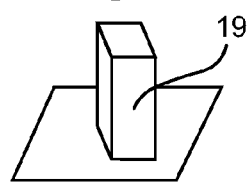
Figure 2F:
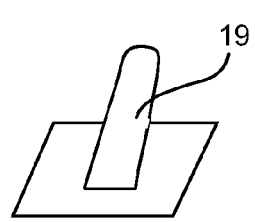
Figure 2G:
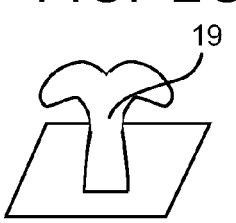
Figure 2H:
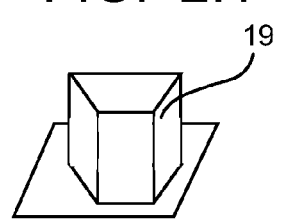
Figure 2I:
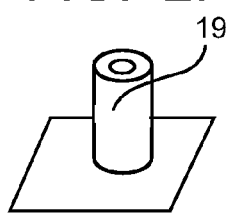
Figure 2J:
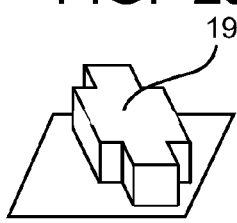
Figure 2K:
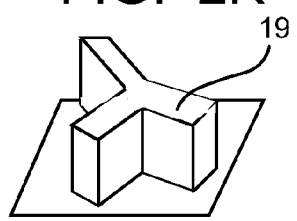
Figure 2L:
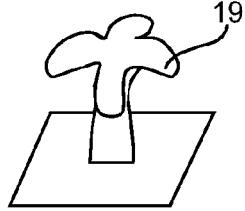
Figure 2M:
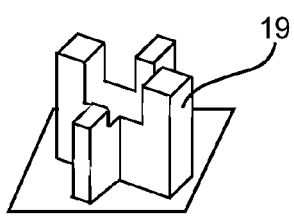
Figure 2N:
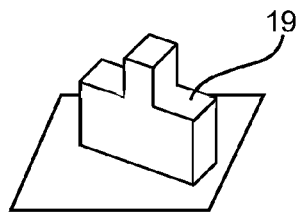

Although hook-shaped cavities and hook-shaped projections are referenced herein, it is anticipated that cavities may be chosen to produce projections having other shapes which may function as the "hook" portion of a touch fastener system including, but not limited to, straight pins, angled pins, tapered pins, mushroom headed pins and curved pins, as well as elements with varying cross-sections such as, but not limited to round, oval, square, rectangular, trapezoidal, cross, multi-lobed, grappling hook, multi-limbed or combinations of these. The projections may have a solid core or may be in hollow form such as tubular. Examples of some of these shapes are shown in FIG. 2A-N. For instance, FIG. 2G is an example of a multi-lobed projection, FIG. 2I is an example of tubular, FIG. 2J is an example of cross-shaped, FIG. 2K is an example of Y-shaped, FIG. 2L is an example of a grappling hook and FIG. 2M is an example of multi-limbed. It is further contemplated that where FIG. 2J is an example of a four-limbed projection and FIG. 2K is an example of a three-limbed projection, that projections may include additional limbs, such as 5, 6, 7, 8, etc. Such projections may vary in height, thickness and in the angle that they may project from the carrying strip 21 or substrate. In addition, the projections may be formed of a uniform height or may vary in height.

Figure 3:
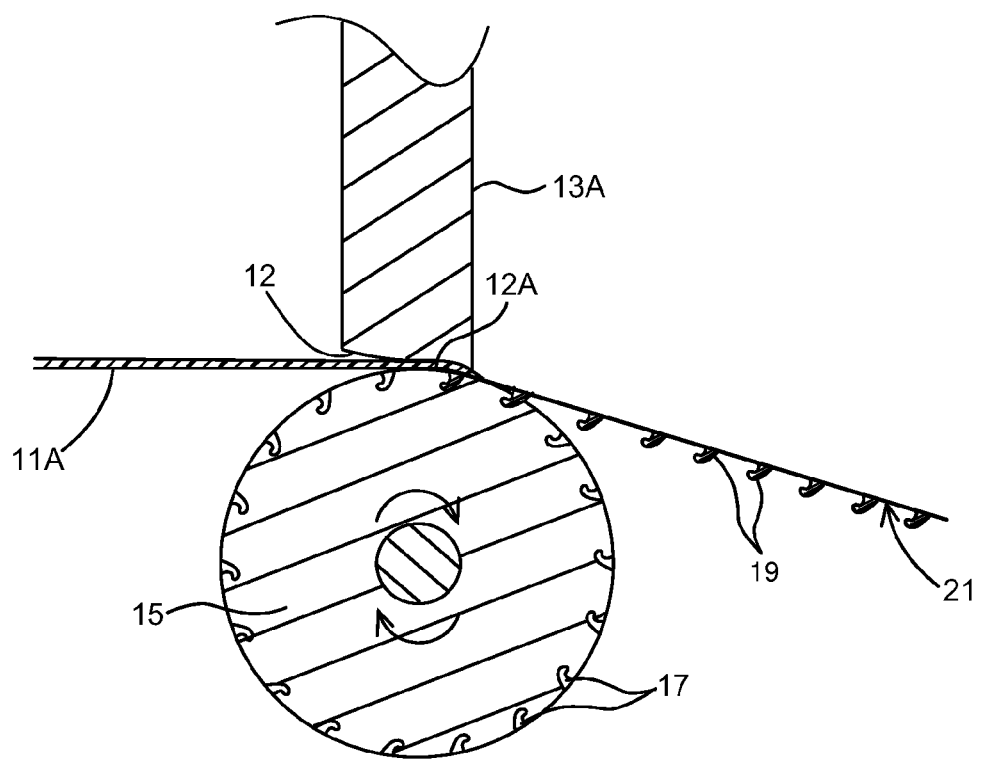
FIG. 3 is a schematic cross-sectional side view of another apparatus and process for making projections that may be used as hook fasteners in accordance with the present disclosure.

The surfaces of the vibrating source 13 may be shaped so as to increase the length of time thermoplastic materials may be subjected to the vibration energy or to otherwise improve the properties and/or performance of the process. FIG. 3 shows one example of one type of a modified surface for a vibrating source 13A wherein a portion of the surface 12A of the vibrating source 13A has been provided which is complementary in shape to the surface of the molding roll 15. Also, in FIG. 3, a portion 12 of the vibrating surface has been modified, in this example as a complex curved surface, to allow thicker thermoplastic materials 11A to pass between the vibrating source 13A and the molding roll 15. Shaping of the vibrating source 13A may also be used to reduce distortion of the finished product and to aid in guiding the thermoplastic material substrate 11 between the vibrating source 13 and the rotating molding roll 15.

Figure 4:
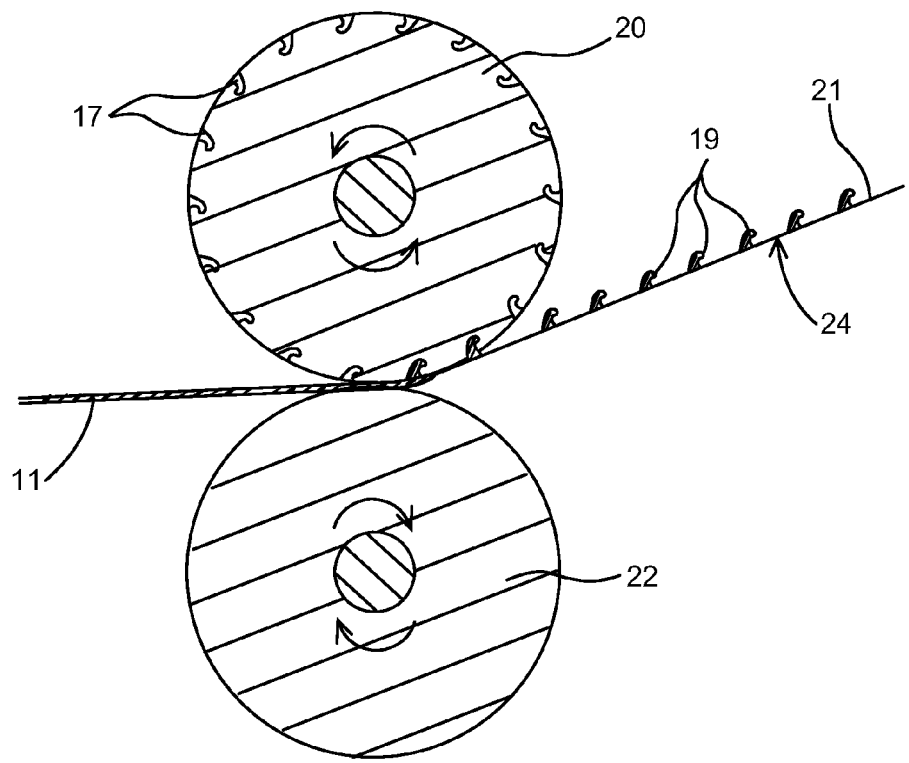
FIG. 4 is a schematic cross-sectional side view of another apparatus and process for making projections that may be used as hook fasteners in accordance with the present disclosure.

In another exemplary embodiment, as shown in FIG. 4, the source of vibration may be a roll which may include cavities for forming the projections and a rotating roll 22 may be positioned so as to force the softened thermoplastic into the cavities. The rotating vibration source 20 may contain multiple hook-shaped or otherwise shaped cavities 17 along its' outer periphery and may be used in place of the stationary vibrating source 13, 13A (as shown in FIGS. 1 and 3) and positioned in close proximity to the rotating roll 22. The vibrating source 20 may be a rotary ultrasonic horn. These horns may be made from, for instance, titanium and are sold in the United States by Branson Ultrasonics and in Europe by Mecasonics. A roll with a patterned surface may be substituted for the smooth roll if patterning the back surface 24 of the product is desired. Patterning the back of the product to simulate woven structures or leather materials or other designs may serve to enhance the aesthetics and/or functionality of the product. In some cases, a patterned surface may be designed on one or both rolls to form apertures in the base material thereby making the fastener breathable or permeable.

In another exemplary embodiment, as shown in FIG. 5, a rotating vibration source 20 containing multiple hook-shaped or otherwise shaped cavities 17, along its outer periphery as shown in FIG. 4, may be positioned in close proximity to a non-rotating stationary platen 26. The platen surface 28 may be smooth or patterned if patterning the back surface of the product is desired.

Figure 6:
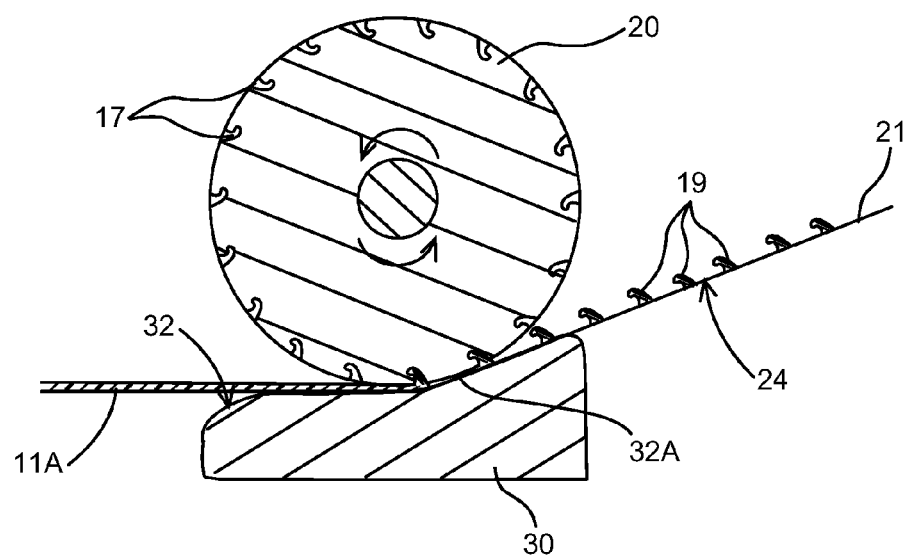
FIG. 6 is a schematic cross-sectional side view of another apparatus and process for making projections that may be used as hook fasteners in accordance with the present disclosure.

FIG. 6 shows an exemplary embodiment of another type of modified stationary platen 30 in combination with a rotary vibration source 20. In this example, one surface 32 of the platen has been modified, in this example as a complex curved surface, to allow thicker thermoplastic materials (substrates) to pass between the vibrating source 20 and the modified stationary platen 30. Reference numeral 32A indicates an area where the surface of the platen 30 is complementary in shape to the shape of the surface of the rotary vibration source 20. Shaping of the modified stationary platen 30 may also be used to reduce distortion of the finished product and aid in guiding the thermoplastic material substrate 11A between the rotating vibration source 20 and the stationary platen 30. The platen surface 32 may be smooth or patterned if patterning the back surface of the product is desired.

In another exemplary embodiment, as shown in FIG. 7, a rotating vibration source 20 containing multiple hook-shaped or otherwise shaped cavities 17 along its outer periphery, may be combined with a rotating molding roll 15 (such as is shown in FIG. 1) to produce a polymeric strip having projections on both the front and back side of the sheet 21A. The rotating vibration source 20 may be positioned in close proximity to the outer surface of the rotating molding roll 15 and both rolls may contain multiple hook-shaped or otherwise shaped cavities 17, along their outer peripheries. As shown, this may allow for the production of products with hook-shaped or otherwise shaped elements 19 on the front surface 23 and back surface 24 of the carrying strip 21A simultaneously.

In another exemplary embodiment, as shown in FIG. 8, a rotating vibration source 20 containing multiple hook shaped or otherwise shaped cavities 17, along its outer periphery may be positioned in close proximity to another rotating vibration source 20A containing multiple hook shaped or otherwise shaped cavities 7, along its' outer periphery. This would allow for the production of products with hook-shaped or otherwise shaped elements 19 on the front surface 23 and back surface 24 of the carrying strip 21A simultaneously.

Figure 9:
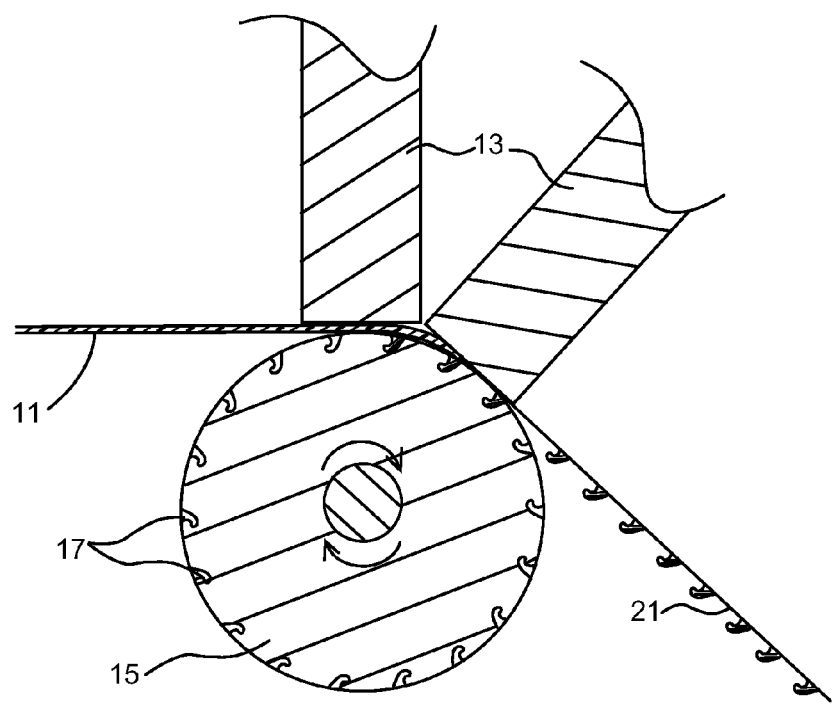
FIG. 9 is a schematic cross-sectional side view of another apparatus and process for making projections that may be used as making hook fasteners in accordance with the present disclosure.

In still another exemplary embodiment, two or more sources of vibration, either stationary or rotary in nature, may be utilized simultaneously. FIG. 9 depicts the use of two vibrating stationary sources 13 in close proximity to a rotating molding roll 15 containing multiple hook-shaped or otherwise shaped cavities 17, along the outer periphery of the molding roll 15.

As described above, the process and apparatus according to the present disclosure is suitable for forming a product having projections which may function as hook fasteners or projecting elements having other shapes in touch fastening systems on one or more surfaces of a strip of thermoplastic material substrate, the substrate comprising film, sheet, web, composite, laminate or other form, or from portions thereof. The substrate may include a cellular structure, such as a foamed polymer, for example, or be a molecularly oriented film or a composite that may, for example, include a fibrous reinforcement. The projections may have a variety of shapes, lengths and dimensions. The projections may be formed from one or more of the materials making up the multilayered film or substrate sheet or portions of such.

It is contemplated that at least a portion of the substrate may comprise a thermoset polymer.

It is further contemplated that the substrate upon which the projections are formed may include continuous or intermittent layers of materials and combinations thereof. For instance, it is contemplated that projections may be formed on an intermittent web, to produce diaper closure tabs, possibly inline with a diaper manufacturing machine.

It is further contemplated that projections may be formed in their final shape or produced partially shaped and post-formed to obtain their final geometry, for instance, a straight pin that may be reshaped into a hook shape, or a straight pin that may be blunted into a mushroom shape in a subsequent processing step or a deformed hook that may be post-formed into a hook capable of functioning as a fastening element.

It is further contemplated that the projections as formed herein may provide a means of fastening, either temporary or permanent, by engaging with a material having loop elements (e.g. structures that will mechanically engage a projection such as a hook), or engaging to screen-like materials, open-celled foam-like materials or a material having similar or mating projections (for instance, hooks, mushrooms, etc.)

In a particular advantage of the process described herein, the projections of the present disclosure may be formed intermittently on a substrate by turning the source(s) of vibration on and off as desired or by intermittently altering the position and/or contacting force and/or vibration frequency of the vibrating source. For example, one may move an ultrasonic horn or other vibration source up and down intermittently while a web passes through the process to intermittently form projections on a substrate. As such, projections may be formed in a desired pattern, and the pattern may be varied during the in-line processing of the substrate. Accordingly, the projections may be of uniform height or multilevel height depending on the conditions of operation of the apparatus.

Figure 11:
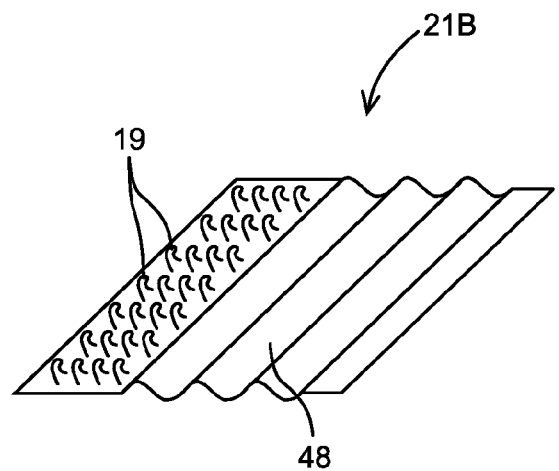
FIG. 11 is a schematic view of an article produced by the process and apparatus of FIG. 10A.

Projections, according to the present disclosure may be formed on a substrate, such as a web, with portions of the web formed to be creped or folded to allow the web to stretch. FIG. 10A is a schematic front view showing an exemplary embodiment of a configuration of apparatus wherein the molding roll 42 includes a portion 44 of the surface including cavities to form projecting elements and the vibrating source 40 and molding roll 42 each include complementary portions of their surfaces 46, 46A configured to form a creped area. FIG. 10B is a schematic cross-sectional side view of FIG. 10A. FIG. 11 depicts an example of a product that may be produced from the configuration depicted in FIG. 10A. In this example, hook type elements 19 have been formed adjacent to creped areas 48 on a web 21B. This type of configuration may prove appealing if used to form hook elements and creped areas on diaper closure tabs, eliminating the complex combinations of adhesive bonded touch fasteners to elastomeric non-wovens currently employed for this application. The creped portion and the fastening portion may thus be formed into a web material simultaneously such that an extendable diaper fastening tab is formed. Either of the surfaces 46, 46A may be configured to form a crepe area or one of the surfaces may comprise a compliant material, such as rubber or an elastomer, which under nip pressure will conform to the opposing surface configuration. Reference to crepe, may be understood to mean a quality in a web imparted by embossing to give a wavy surface such as a crimp in a web. Reference to a wavy surface may be understood to mean a surface that rises and falls in relative position.

Figure 13:
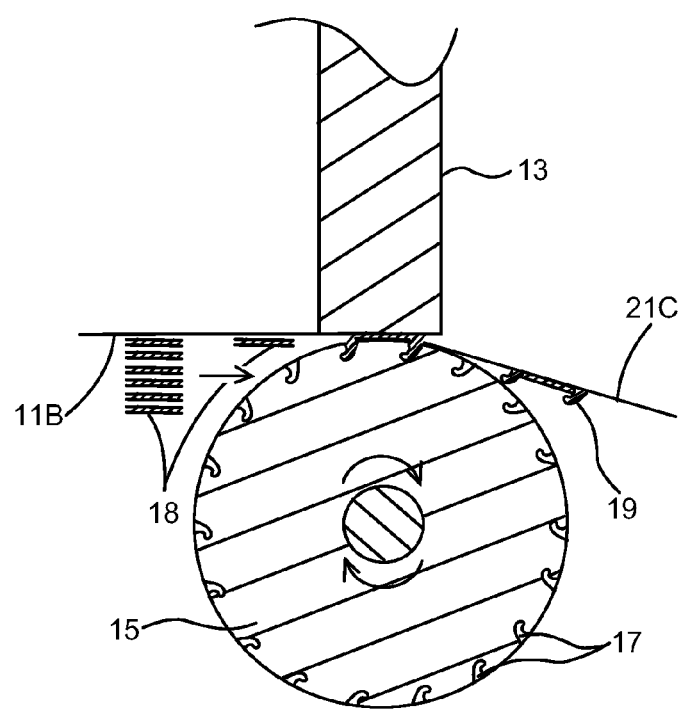
FIG. 13 is a schematic cross-sectional side view of another apparatus and process for making projections that may be used as hook fasteners wherein other materials may be intermittently fed between the source of vibration and the substrate in accordance with the present disclosure.

In another exemplary embodiment, projections may be formed while simultaneously attaching them to an extensible or non-extensible web. As shown in FIG. 13, an extensible material or non-extensible material 11B may be fed between a rotating molding roll 15 and a stationary source of vibration 13 (or rotating source of vibration or other configurations of mold and vibration sources for forming projections, as disclosed herein) (see, for instance, FIGS. 1, 3-9, 10A and 10B). The vibration source 13 may be positioned in close proximity to the mold 15, but far enough away to avoid melting or deforming the extensible material or non-extensible material 11B. Pieces of thermoplastic or thermosettable materials 18 materials may be intermittently fed between one or more sides of the extensible material or non-extensible material 11B and the vibration source 13. When the pieces pass between the vibration source 13 and the mold roll 15, for example, the additional thickness may cause the thermoplastic or thermosettable material to be forced into the cavities 17.

Further, a pattern of projections may be formed by passing a pre-perforated or pre-die cut masking material between the substrate (film, sheet, composite, etc.) and molding roll thereby selectively covering areas of the molding roll and providing an intermittent pattern of projections. The mask may be removed (FIG. 22) or may be bonded to the substrate (FIG. 21) if desired. Accordingly, variations in patterns may be provided relatively easily without having to change the configuration of the molding roll. The die cutting, or other formation of a mask may be done in-line or off-line.

Figure 20A:
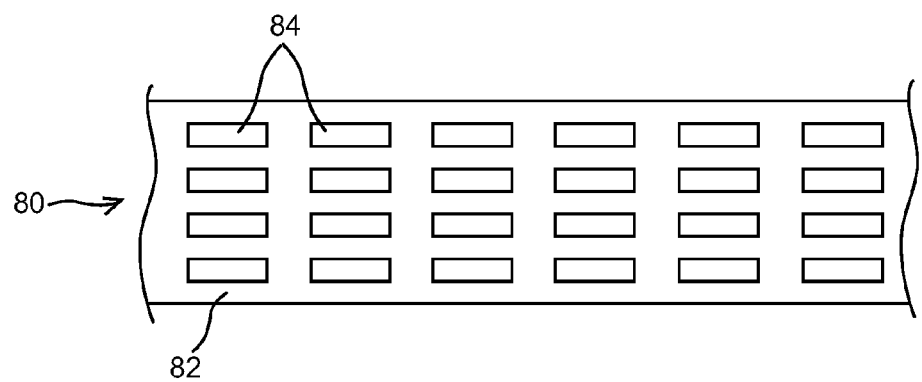
FIGS. 20A and 20B are top views of two exemplary masking materials to be used in conjunction with processes of the present disclosure.
Figure 20B:
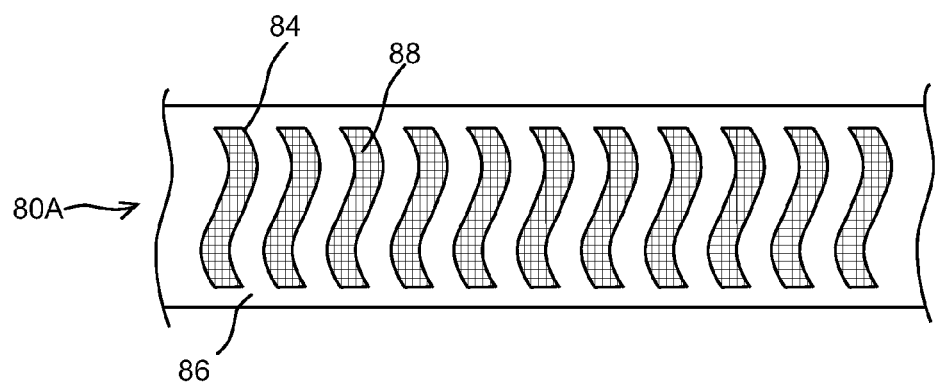

FIGS. 20A and 20B illustrate examples of masking materials for such a purpose. FIG. 20A is a top view of a mask 80 comprising a sheet of material 82, such as paper, metal, film, fabric, etc. which has one or more openings 84 formed therein. FIG. 21 illustrates the apparatus and process of FIG. 1 wherein a mask 80 in sheet form is fed into the nip between the vibration source 13 and the molding roll 15 such that portions of the mask cover selected cavities 17 in the molding roll and an intermittent pattern of projections 19 are formed through the openings 84 on the surface of the formed substrate 21.

Figure 22:
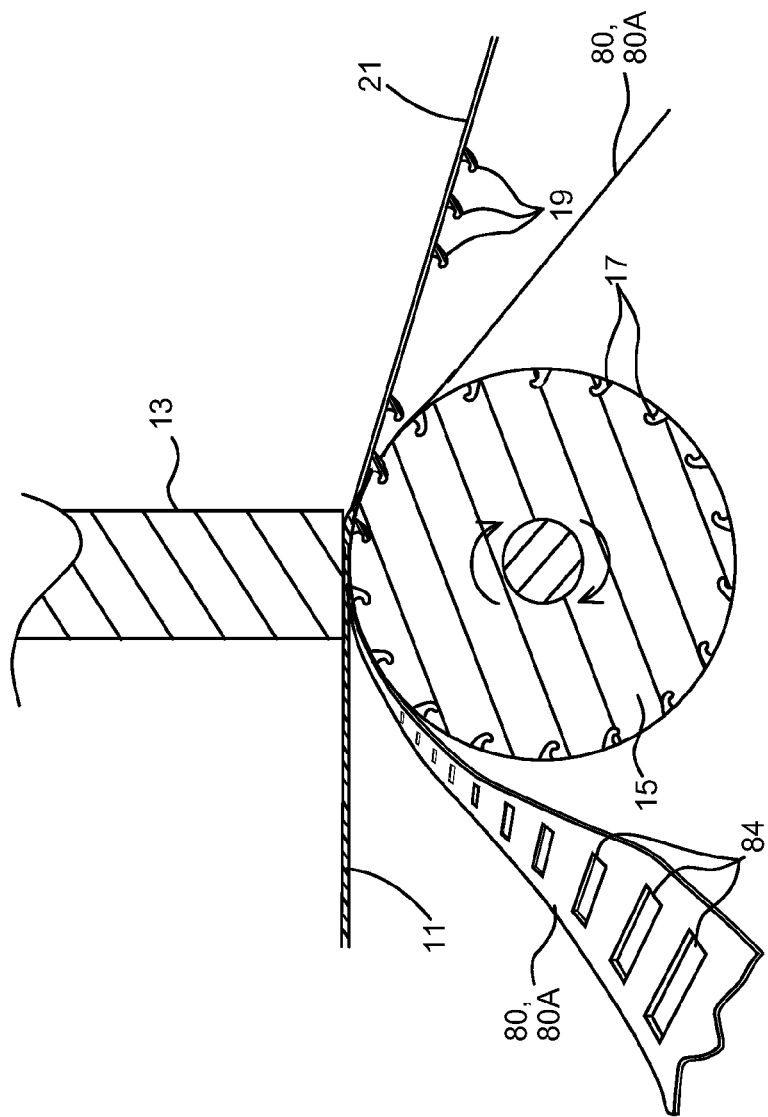
FIG. 22 is a schematic cross-sectional side view of the apparatus and process of FIG. 1 for making projections that may be used as hook fasteners wherein a masking material is used to provide an intermittent pattern of projections on a substrate but the mask is not combined with the substrate produced in accordance with the present disclosure.

FIG. 22 illustrates a similar process where the mask 80 may be separated from the substrate 21 and not become part of the finished product.

Figure 23:
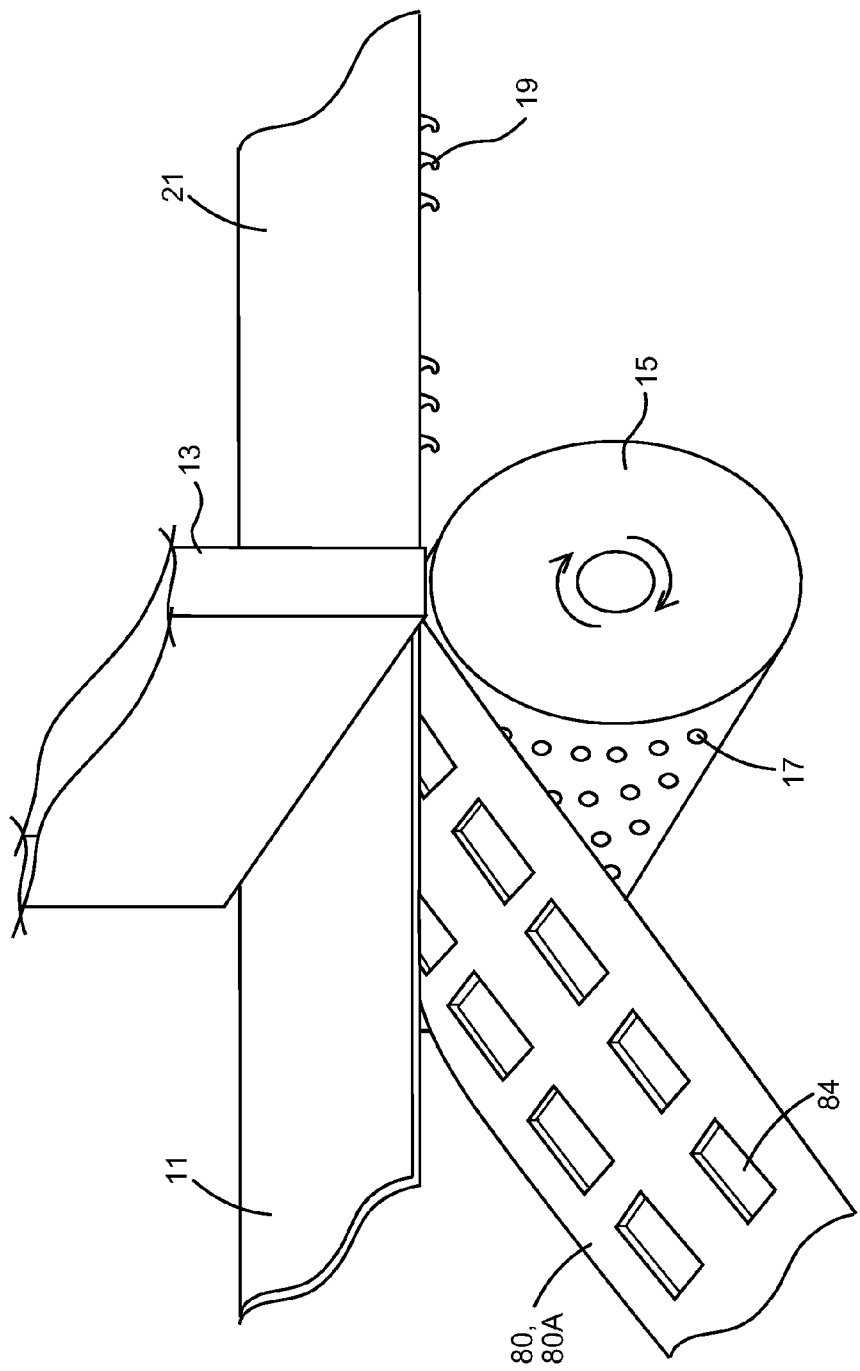
FIG. 23 is a prospective view of the apparatus of FIG. 21.

FIG. 23 is a perspective view of the apparatus and process of FIG. 21.

Figure 24:
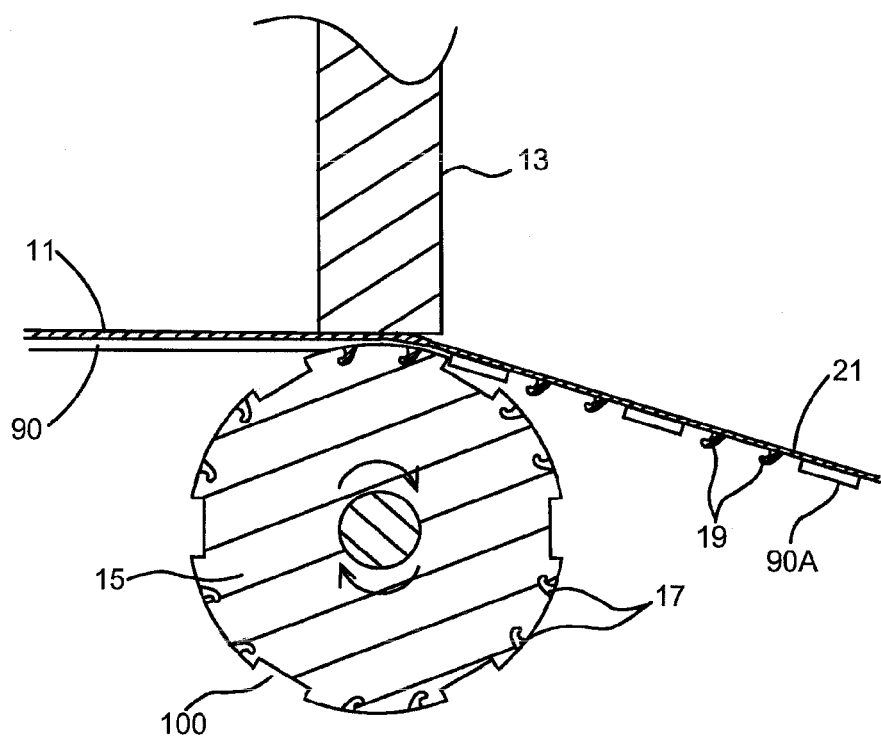
FIG. 24 is a schematic cross-sectional side view of the apparatus and process of FIG. 1 for making projections that may be used as hook fasteners wherein a gasketing material is provided an intermittent pattern of projections on a substrate, the gasket surrounding the discrete areas of projections, in accordance with the present disclosure.

FIG. 24 illustrates another apparatus and process similar to FIG. 1 wherein a material 90 in sheet form (such as a foam, non-woven web, etc.) is laminated to a substrate material 11 and fed into the nip between the vibration source 13 and the molding roll 15. Portions 100 of the molding roll 15 may be removed to allow portions of the material 90 to provide an intermittent pattern of projections 19 and to further allow the material 90A to surround the discrete areas of projections 19 and act as a gasket. Accordingly, as shown an intermittent pattern of projections 19 are formed like islands between the areas of material 90A. The thermoplastic material of layer 11 impregnates the material 90 when the projections 19 are formed. It is contemplated that the height of the projections 19 may be less than the height of the material 90A such that the projections do not engage a mating fastening system element and premature engagement is substantially prevented. In an application such as a fastening tab for a diaper this may also provide protection from the projections encountering the baby's skin.

In addition, it is contemplated that projections may be formed through openings in covering layers of material by passing multiple layers of material between a molding roll and vibration source where the covering layer may include holes that align with the pattern of cavities in one or more of the rolls, or where porous materials, such as textiles, may provide openings for the substrate material to be forced through and into the cavities in the roll(s), or where the strength of the covering layer is sufficiently weak such that a substrate material may burst through the covering material and into the cavities of the mold.

FIG. 20B illustrates another type of mask 80A made from a porous substrate material 88, such as screen, non-woven, open-cell foam, etc. that has been covered by, for instance a coating or by laminating another material 86 except in areas wherein openings 84 are formed in the coating. The porous material 88 is visible through the openings 84 such that projections may be formed therethrough, while the coated areas of the mask act to prevent the formation of projections 19. It is further contemplated that a mask may be applied locally directly to a portion of the surface of the molding roll such as by spraying or dipping a liquid and then drying such. This coating may then prevent the formation of projections in selected areas of the substrate. The mask may be reused or peeled off and reapplied.

Further, a laminate of multiple layers, for instance, thermoplastic substrate/fabric/thermoplastic fabric may be passed between cooperating rolls/vibration sources (see, for instance, FIGS. 7 and 8) to provide a pattern of back-to-back projections having a reinforcing layer.

It is further contemplated that intermittent cuts or slits or otherwise shaped apertures may be produced in the substrate by raising portions of the molding roll surface (or rotary horn surface) to create cuts or very thin portions of the substrate. These modifications to the substrate may serve to make the fastening strip softer and/or stretchable and/or breathable.

The process and apparatus as described herein may provide advantages over an extrusion/molding process as relatively less heating and cooling energy may be consumed since only the material used to form the projections may be heated and cooled. Further, multiple colors may be provided by the choice of substrate material and a broad variety of properties may be obtained through the selection of substrate materials, including but not limited to, molecularly oriented substrates or composite substrates. Materials that have printed patterns, logos, etc., may be used as substrates and thereby have projections formed into one or more of their surfaces allowing the printed patterns, etc. to remain legible. Start-up time for the process may be relatively fast and the process may be started and stopped at will, eliminating the need for complex and costly automated transfer winders, as are often required in continuous extrusion processes. Finally, floor space may be reduced substantially.

Touch fasteners are often adhered to various thermoplastic objects. One such application involves the attachment of touch fasteners to automotive door panels and interior headliner panels. The materials chosen for use as touch fasteners (polyamides, polyolefins, etc.) often make adhesive bonding difficult, expensive and a common source of failure. It is contemplated that a version of the process and apparatus described herein may eliminate or reduce the need for adhesives to bond fasteners to base materials as the hook-type fasteners (projections) may be formed as part of or formed onto the surface of such base materials.

Figure 14A:
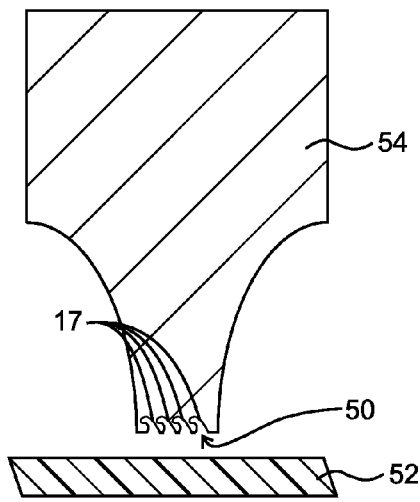
FIGS. 14A-C are sequential schematic cross-sectional side views of an apparatus and process for making projections that may be used as hook fasteners in an intermittent manner at a location on a thermoplastic object in accordance with the present disclosure.
Figure 14B:
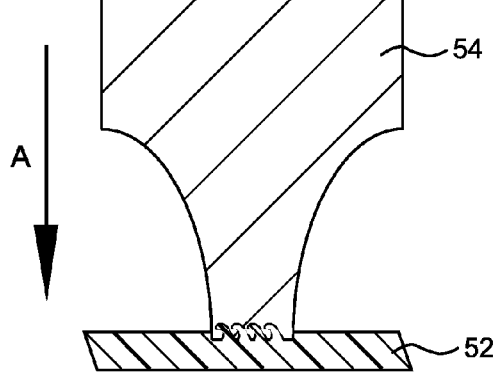
Figure 14C:
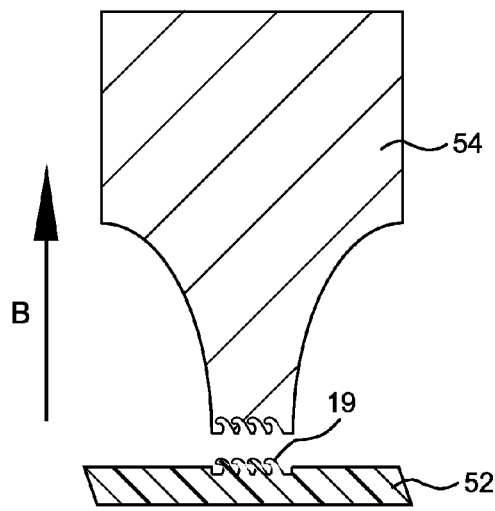

The processes and apparatus described heretofore are primarily directed at continuous or semi-continuous methods of forming projections on various surfaces. In another exemplary embodiment, which may be described as "plunge forming", the projections may be formed anywhere on a thermoplastic object using automatic equipment, a robotically held or hand-held horn, or other source of vibration, which may be brought to the location where the projections are desired to be formed. FIGS. 14A, B and C illustrate a process where an ultrasonic horn 54 may have a vibrating surface 50 which may be constructed with cavities 17 located thereupon (FIG. 14A). The ultrasonic horn 54 may be pressed (arrow A) against a thermoplastic object 52 (for instance, a door panel or headliner substrate for a vehicle) and vibration energy applied (FIG. 14B), selectively softening the thermoplastic material and forcing some of the thermoplastic material 52 into the cavities 17. The vibration energy may then be stopped, the thermoplastic material allowed to cool and the ultrasonic horn retracted (arrow B, FIG. 14C) freeing the newly formed projections 19 from the cavities 17 and providing a plastic object having a surface with a local pattern of projections for attachment formed thereupon.

In some instances, an after-burst of ultrasonic energy may be applied during or after cooling has taken place to aid in "decoupling" the projections from the mold or horn. This may be particularly useful when the projections are formed in the surface of the source of energy, i.e. the horn. It is contemplated that a removable or replaceable horn tip may be used to allow relatively rapid changing of the pattern of projections.

Figure 15A:
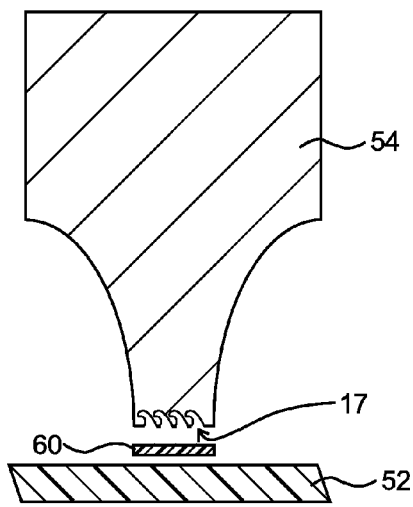
FIGS. 15A-C are sequential schematic cross-sectional side views of another apparatus and process for making projections that may be used as making hook fasteners in an intermittent manner at a location on a thermoplastic object in accordance with the present disclosure.
Figure 15B:
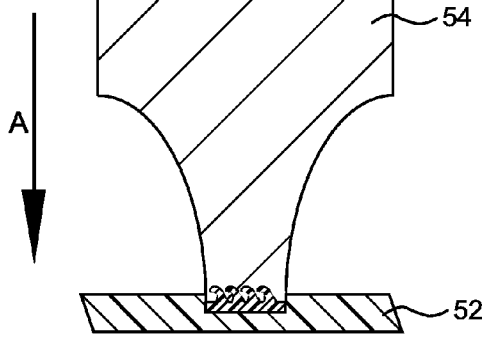
Figure 15C:
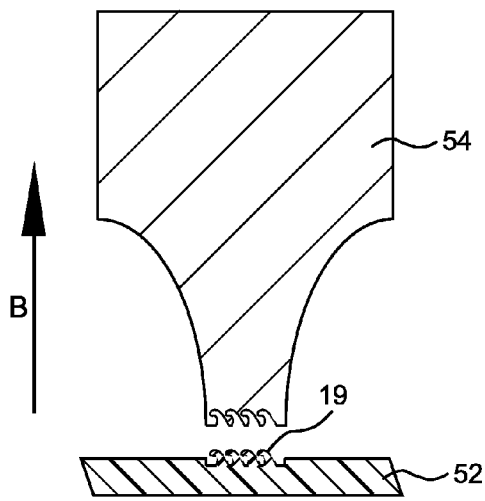

FIGS. 15A, B and C illustrate similarly that various thermoplastic or thermosettable materials 60 may be positioned between the ultrasonic horn 54 and the object 52 (FIG. 15A) allowing for the formation of projections 19, fully or partially from the positioned material 60 (FIG. 15B). In this manner, the projections 19 may be formed from a second material 60 and through the vibration process that material may be bonded to the object 52 (FIG. 15C). It may be appreciated that this will have particular utility in that situation where the object 52 is an automotive trim panel, which may be understood as a thermoplastic and/or thermoset door panel, instrument panel, center console, rear close-out panels, headliner, etc.

Figure 16A:
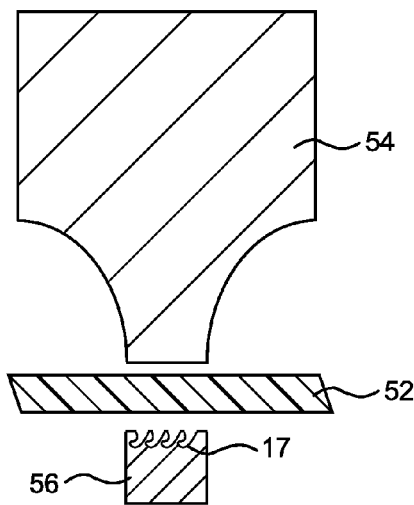
FIGS. 16A-C are sequential schematic cross-sectional side views of another apparatus and process for making projections that may be used as hook fasteners in an intermittent manner at a location on a thermoplastic object in accordance with the present disclosure.
Figure 16B:
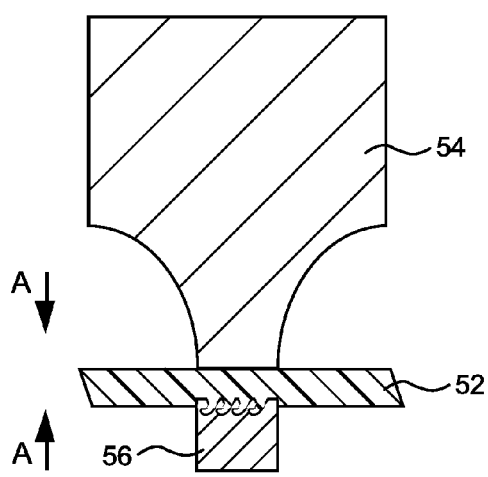
Figure 16C:
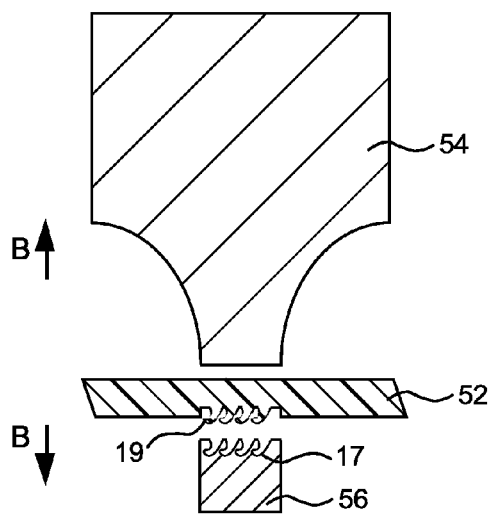

In another exemplary embodiment, as shown in FIGS. 16A, B and C, the cavities may be provided in a mold-like base 56 and not in the ultrasonic horn 54. The thermoplastic object 52 may be positioned (FIG. 16A) and held under pressure (arrows A, FIG. 16B) between the ultrasonic horn and the mold base 56. Vibration energy may be applied to the horn (FIG. 16B), forcing some material from the object 52 into the cavities 17 of the base. Again, the vibration energy may be stopped, the thermoplastic material allowed to cool and the ultrasonic horn retracted (arrows B) (FIG. 16C) freeing the newly formed projections 19 from the cavities 17 and providing a plastic panel having a surface with a local pattern of projections formed thereupon for attachment thereto.

FIGS. 17A, B and C illustrate that various thermoplastic or thermosetting materials 60 may be positioned between the object 52 requiring the projections 19 and the mold-like base 56 containing the cavities 17 (FIG. 17A). The projections may be formed from the material 60 by forcing the horn 54 and mold 56 together around the object 52 and material 60 and applying vibration energy (arrows A, FIG. 17B). Again, the vibration energy may be stopped, the thermoplastic material allowed to cool and the ultrasonic horn retracted (arrows B) (FIG. 17C) freeing the newly formed projections 19 from the cavities 17 and providing a plastic panel having a surface with a local pattern of projections formed thereupon, the projections of a different material than the object 52.

The process and apparatus described herein may greatly reduce the complexity of insert molding hook type materials into larger molded objects as different types of materials may be fed in layers to the apparatus and the projections formed on or through one or more of the layers. Materials for a portion of the substrate layer or for the projections may thus be different from the substrate materials. The use of an ultrasonic horn or other source of vibration energy and the use of a mold-like base as disclosed herein to form projections on objects in a discontinuous or intermittent process or to locally form a pattern of projections on the surface of an object, may provide relatively lower capital and space requirements as well as a very flexible process capable of being easily moved. It is contemplated that all of the features disclosed regarding the continuous or semi-continuous process herein also may apply to the local application of projections on an object.

The projections disclosed herein for use as elements in a touch fastening system may be produced in a relatively wide range of sizes and densities to provide a wide range of fastening or holding strength. While not being held to any particular limits, it is contemplated that the height of such projections may range from less than about 10 microns to greater than about 5 mm.

The description and drawings illustratively set forth the presently preferred invention embodiments. The description and drawings are intended to describe these embodiments and not to limit the scope of the invention. Those skilled in the art will appreciate that still other modifications and variations of the present invention are possible in light of the above teaching while remaining within the scope of the following claims. Therefore, within the scope of the claims, one may practice the invention otherwise than as the description and drawings specifically show and describe.

What is claimed is:

1. A process for forming projections suitable for use in a touch fastener on a substrate comprising:
providing a first device having an outer surface;
providing a substrate material having a first surface;
providing a second device as a source of vibration energy;
wherein said first device and/or said second device contains a plurality of cavities, at least some of said cavities having a shape to produce a projection suitable for use in a touch fastener;
positioning said substrate material between said first device and said second device;
applying power to said second device to locally soften said substrate material such that a portion of said softened substrate material is forced into said cavities to form projections suitable for use in a touch fastener on a portion of said first surface of said substrate material and a portion of said substrate material serves as a touch fastener carrier for said projections.

2. The process of claim 1 wherein at least a portion of said first device and/or said second device includes a wavy surface and further comprising forming at least a portion of said substrate material into a creped area.

3. The process of claim 1 wherein applying power to said second device comprises applying intermittent power to said second device.

4. The process of claim 1 wherein providing a substrate material comprises providing a film, sheet, web, composite, laminate, foam, fabric, non-woven, fiber-reinforced, thermoplastic and/or thermoset material.

5. The process of claim 1 wherein providing a first device comprises providing a first rotating roll.

6. The process of claim 5 wherein providing a second device comprises providing a second rotating roll.

7. The process of claim 1 wherein providing a first device comprises providing a rotating roll and wherein providing a second device comprises providing a stationary second device.

8. The process of claim 1 wherein providing a second device as a source of vibration energy comprises providing a second device as a source of mechanical or electromechanical or acoustical vibration energy.

9. The process of claim 1 wherein providing a second device comprises providing an ultrasonic horn.

10. The process of claim 1 wherein providing a substrate material comprises providing a first layer and a second layer, with said first layer having one or more openings which expose a surface of a second layer, and wherein forming projections comprises forming projections on said surface of said second layer.

11. The process of claim 1 wherein providing a substrate material comprises providing a laminate comprising continuous and/or intermittent layers of different materials.

12. The process of claim 1 further comprising removing said projections from said cavities and post-forming said projections into a desired shape.

13. The process of claim 12 wherein post-forming said projections comprises applying vibration energy to said projections.

14. The process of claim 12 wherein post-forming said projections comprises post-forming said projections to include mushroom-shaped heads, multi-lobed heads, multi-limbed heads, grappling hook heads or combinations thereof.

15. The process of claim 1 further comprising engaging said projections with a second substrate material having one or more of loop elements, complementary shaped projections or other mating features to fasten said substrate material to said second substrate material.

16. The process of claim 1 further comprising applying vibration energy to aid in removing said projections from said cavities.

17. The process of claim 1 further comprising passing a second substrate material between said substrate material and said first device or said second device and exposing said second substrate material to said vibration energy thereby causing said second substrate material to adhere to said substrate material.

18. The process of claim 17 further comprising forming at least a portion of said projections with said second substrate material.

19. The process of claim 1 wherein providing a substrate material comprises providing a portion of a diaper.

20. The process of claim 2 wherein providing a substrate material comprises providing a portion of a diaper and wherein forming at least a portion of said substrate material into said creped area comprises forming at least a portion of said substrate material into said creped area adjacent a region containing said projections.

21. The process of claim 1 further comprising forming apertures in said substrate.

22. A process for forming projections suitable for use in a touch fastener on a substrate comprising:
providing a substrate material having a first surface;
providing a device as a source of vibration energy, said device having a surface containing a plurality of cavities, said cavities arranged along at least a portion of said surface, at least some of said cavities having a shape to produce a projection suitable for use in a touch fastener;
pressing said device against said first surface of said substrate material;
applying power to said device to locally soften said substrate material such that a portion of said softened substrate material is forced into said cavities in said surface of said device to form projections suitable for use in a touch fastener on said first surface of said substrate material, said projections generally conforming to said shape of said cavities, a portion of said substrate serves as a touch fastener carrier for said projections.

23. The process of claim 22 further comprising manually or automatically pressing said device against said first surface of said substrate material.

24. The process of claim 22 further comprising removing said projections from said cavities and post-forming said projections into a desired shape.

25. The process of claim 24 wherein post-forming said projections comprises applying vibration energy to said projections.

26. The process of claim 24 wherein post-forming said projections comprises post-forming said projections to include mushroom-shaped heads, multi-lobed heads, multi-limbed heads, grappling hook heads or combinations thereof.

27. The process of claim 22 further comprising passing a second substrate material between said substrate material and said device and exposing said second substrate material to said vibration energy thereby causing said second substrate material to adhere to said substrate material.

28. The process of claim 22 wherein providing a substrate comprises providing an automotive trim panel.

29. The process of claim 11 wherein providing a laminate of different materials comprises providing a laminate of different materials including one or more of foam, fiber-reinforced plastic, oriented thermoplastic or thermosetting materials.

30. The process of claim 1 wherein said cavities are shaped to form projections which are shaped as one or more of hooks, mushrooms, straight pins, angled pins, tapered pins, curved pins, grappling hook, multi-limbed, cross-shaped, Y-shaped and multi-lobed, each having cross-sections which are round, oval, square, rectangular, trapezoidal, solid, hollow and combinations thereof.

31. The process of claim 22 wherein said cavities are shaped to form projections which are shaped as one or more of hooks, mushrooms, straight pins, angled pins, tapered pins, curved pins, grappling hook, multi-limbed, cross-shaped, Y-shaped and multi-lobed, each having cross-sections which are round, oval, square, rectangular, trapezoidal, solid, hollow and combinations thereof.

32. The process of claim 22 wherein providing a substrate material comprises providing a film, sheet, web, composite, laminate, foam, fabric, non-woven, fiber-reinforced, thermoplastic and/or thermoset material.

33. The process of claim 17 wherein passing a second substrate material between said substrate material and said first device or said second device comprises passing a laminate between said substrate material and said first device or said second device, wherein said laminate comprises a continuous and/or intermittent layers of different materials.

34. The process of claim 33 wherein passing a laminate between said substrate material and said first device or said second device comprises providing a laminate of different materials including one or more of foam, fiber-reinforced plastic, oriented thermoplastic or thermosetting materials.

35. The process of claim 1 further comprising passing a second material between said substrate material and said first device or said second device, wherein said second material comprises paper or metal.

36. The process of claim 22 further comprising passing a second material between said substrate material and said device, wherein said second material comprises paper or metal.

37. The process of claim 22 wherein providing a substrate material comprises providing a laminate comprising continuous and/or intermittent layers of different materials.

38. The process of claim 37 wherein providing a laminate of different materials comprises providing a laminate of different materials including one or more of foam, fiber-reinforced plastic, oriented thermoplastic or thermosetting materials.

39. The process of claim 27 wherein passing a second substrate material between said substrate material and said device comprises passing a laminate between said substrate material and said first device or said second device, wherein said laminate comprises a continuous and/or intermittent layers of different materials.

40. The process of claim 39 wherein passing a laminate between said substrate material and said device comprises providing a laminate of different materials including one or more of foam, fiber-reinforced plastic, oriented thermoplastic or thermosetting materials.

41. The process of claim 1 further comprising applying power to said second device to form projections suitable for use in a touch fastener on a portion of a second surface of said substrate opposite said first surface of said substrate.

42. The process of claim 22 further comprising applying power to said device to form projections suitable for use in a touch fastener on a portion of a second surface of said substrate opposite said first surface of said substrate.

* * * * *